United States Patent
Pan et al.

(10) Patent No.: US 6,760,306 B1
(45) Date of Patent: Jul. 6, 2004

(54) METHOD FOR RESERVING NETWORK RESOURCES USING A HIERARCHICAL/ SEGMENT TREE FOR STARTING AND ENDING TIMES OF REQUEST

(75) Inventors: Yin Pan, Webster, NY (US); Al Villarica, Fairport, NY (US); Eric Edwards, West Henrietta, NY (US)

(73) Assignee: Nortel Networks Limited, Montreal (CA)

( * ) Notice: Subject to any disclaimer, the term of this patent is extended or adjusted under 35 U.S.C. 154(b) by 759 days.

(21) Appl. No.: 09/672,114

(22) Filed: Sep. 27, 2000

(51) Int. Cl.[7] .............................................. G01R 31/08
(52) U.S. Cl. ...................... 370/230; 370/437; 709/226
(58) Field of Search ................................ 370/237, 230, 370/238, 231, 254, 255, 256, 203, 399, 395.2, 395.21, 395.3, 395.32, 395.4, 400, 411, 409, 431, 437; 709/213, 220, 221, 222, 223, 224, 225, 226–9; 710/36, 38; 712/220–1

(56) References Cited

U.S. PATENT DOCUMENTS

| | | | | |
|---|---|---|---|---|
| 5,644,740 A | * | 7/1997 | Kiuchi | ........................ 345/853 |
| 5,701,137 A | * | 12/1997 | Kiernan et al. | ............. 345/853 |
| 5,794,006 A | * | 8/1998 | Sanderman | .................. 709/223 |
| 5,806,056 A | * | 9/1998 | Hekmatpour | ................. 706/50 |
| 5,825,944 A | * | 10/1998 | Wang | .......................... 382/309 |
| 2002/0124082 A1 | * | 9/2002 | San Andres et al. | ........ 709/225 |

OTHER PUBLICATIONS

Schelén, Olov. "Quality of Service Agents in the Internet," Div. of Computer Comm., Dept. of Computer Science and Electrical Engineering, Luleå University of Technology, Sweden, Aug. 1998, pp iii–107.

* cited by examiner

*Primary Examiner*—David Vincent
(74) *Attorney, Agent, or Firm*—Fish & Richardson P.C.

(57) ABSTRACT

Data over a range of values is stored using a segment tree data structure. One or more nodes are generated to cover the range of values based on a parent node in the segment tree data structure. The one or more nodes are generated by subdividing nodes of the segment tree data structure only along paths from the parent node to the one or more nodes. The data is stored in the one or more nodes.

57 Claims, 21 Drawing Sheets

Creating a service reservation
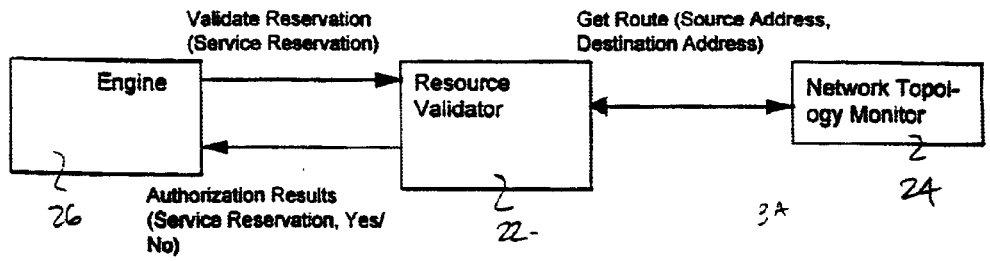
FIG. 8
Activating a service reservation
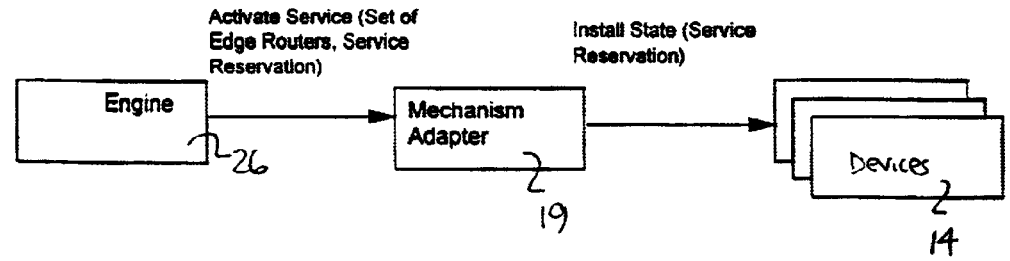
FIG. 9A
Terminating a service reservation
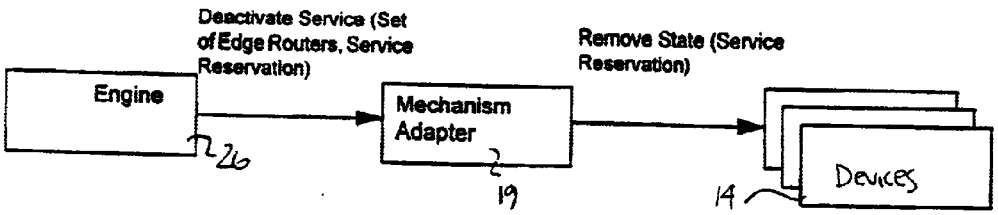
FIG. 9B
FIG. 9

METHOD FOR RESERVING NETWORK RESOURCES USING A HIERARCHICAL/SEGMENT TREE FOR STARTING AND ENDING TIMES OF REQUEST

BACKGROUND

This invention relates to storing data, such as the duration of a network service reservation, using a segment tree data structure.

Segment tree data structures are used to store information over ranges of data. A segment tree data structure includes a parent node and typically one or more "descendent" nodes, which are generated based on the parent node. The one or more descendent nodes each stores a subset of the range of data stored in the parent node. When combined, the range of data that can be stored in the descendent nodes equals that which can be stored in the parent node.

SUMMARY

Network service reservations are made over time periods. Segment tree data structures therefore can be used to store the network service reservations over time periods.

In general, in one aspect, the invention is directed to storing data over a range of values, such as the time period of a network service reservation, using a segment tree data structure. One or more nodes are generated to cover the range of values based on a parent node in the segment tree data structure. The one or more nodes are generated by subdividing nodes of the segment tree data structure only along paths from the parent node to the one or more nodes. The data is stored in the one or more nodes.

This aspect of the invention may include one or more of the following features. The range of values is a duration of the network service reservation. The one or more nodes each has a granularity that makes it possible to cover, without exceeding, the duration of the network service reservation. Subdividing the nodes is performed by generating child nodes for each subdivided node. Each of the child nodes covers a portion of a duration of the subdivided node.

Two nodes are generated for each subdivided node. Each of the two nodes covers half of the duration of the subdivided node. The range of values defines a time duration and the one or more nodes correspond to the time duration. If more than one node is generated, resulting nodes when combined have a duration that corresponds to the time duration. Subdividing is not performed along potential branches of the segment tree data structure that are not on paths from the parent node to the one or more nodes.

In general, in another aspect, the invention is directed to populating nodes in segment tree data structures to cover continuous time durations. This aspect of the invention features generating a first segment tree data structure that includes nodes covering a first time duration and generating a second segment tree data structure that includes nodes covering a second time duration. In this aspect, nodes in the first segment tree data structure are reset to cover a third time duration following expiration of the first time duration.

This aspect of the invention may include one or more of the following features. Nodes in the second segment tree data structure are reset to cover a fourth time duration following expiration of the second time duration. A network service reservation is received. The network service has a predetermined time duration. It is determined which of the first and second segment tree data structure(s) has one or more nodes that cover the predetermined time duration. Data from the network service reservation is stored using the segment tree data structure(s) determined to have one or more nodes that cover the predetermined time duration.

In general, in another aspect, the invention is directed to generating a segment tree data structure. This aspect of the invention features generating a parent node for an existing node of a segment tree data structure to cover the duration that the existing node cannot cover. The parent node has a duration that encompasses a duration of the existing node. The existing node is deleted following a duration of the existing node.

This aspect of the invention may include one or more of the following features. A descendent node of the existing node is deleted when a duration of the descendent node expires. A node is inserted beneath the parent node that covers a duration following the duration of the existing node. The node inserted beneath the parent node branches off to a corresponding segment tree data structure.

A network service reservation is received. The network service reservation has a predetermined time duration. One or more nodes are generated to cover the network service reservation based on the parent node. The one or more nodes are generated by subdividing nodes of the segment tree data structure along paths from the parent node to the one or more nodes. Data from the network service reservation is stored in the one or more nodes.

In general, in another aspect, the invention is directed to a computer-readable medium storing a data structure. The data structure features a plurality of nodes arranged in a tree structure. The plurality of nodes includes a parent node relating to a range of values and one or more final nodes. Each of the one or more final nodes relates to a subset of the range of values. The data structure stores a predetermined range of values in the one or more final nodes. The one or more final nodes are generated by subdividing nodes in the tree structure, starting with the parent node, along paths from the parent node to one or more nodes that correspond to the predetermined range of values.

This aspect of the invention may include one or more of the following features. The predetermined range of values includes data from a network service reservation. The one or more final nodes are generated by subdividing nodes in the tree structure, starting with the parent node, only along paths from the parent node to one or more nodes that correspond to the predetermined range of values.

Other features and advantages of the invention will become apparent from the following description, including the claims and drawings.

DESCRIPTION OF DRAWINGS

FIGS. 4 to 9 are block diagrams showing data flow among components of the resource manager.

DETAILED DESCRIPTION

A network device, called a resource manager, manages resources, such as bandwidth, on other network devices in order to accommodate packet traffic. To this end, the resource manager stores network service reservations in a memory and retrieves the reservations when they come due. A description of the resource manager is set forth below, followed by a description of data structures used to store data for the network service reservations, in particular, the time durations of the network service reservations.

I. Resource Manager

Figure 1:
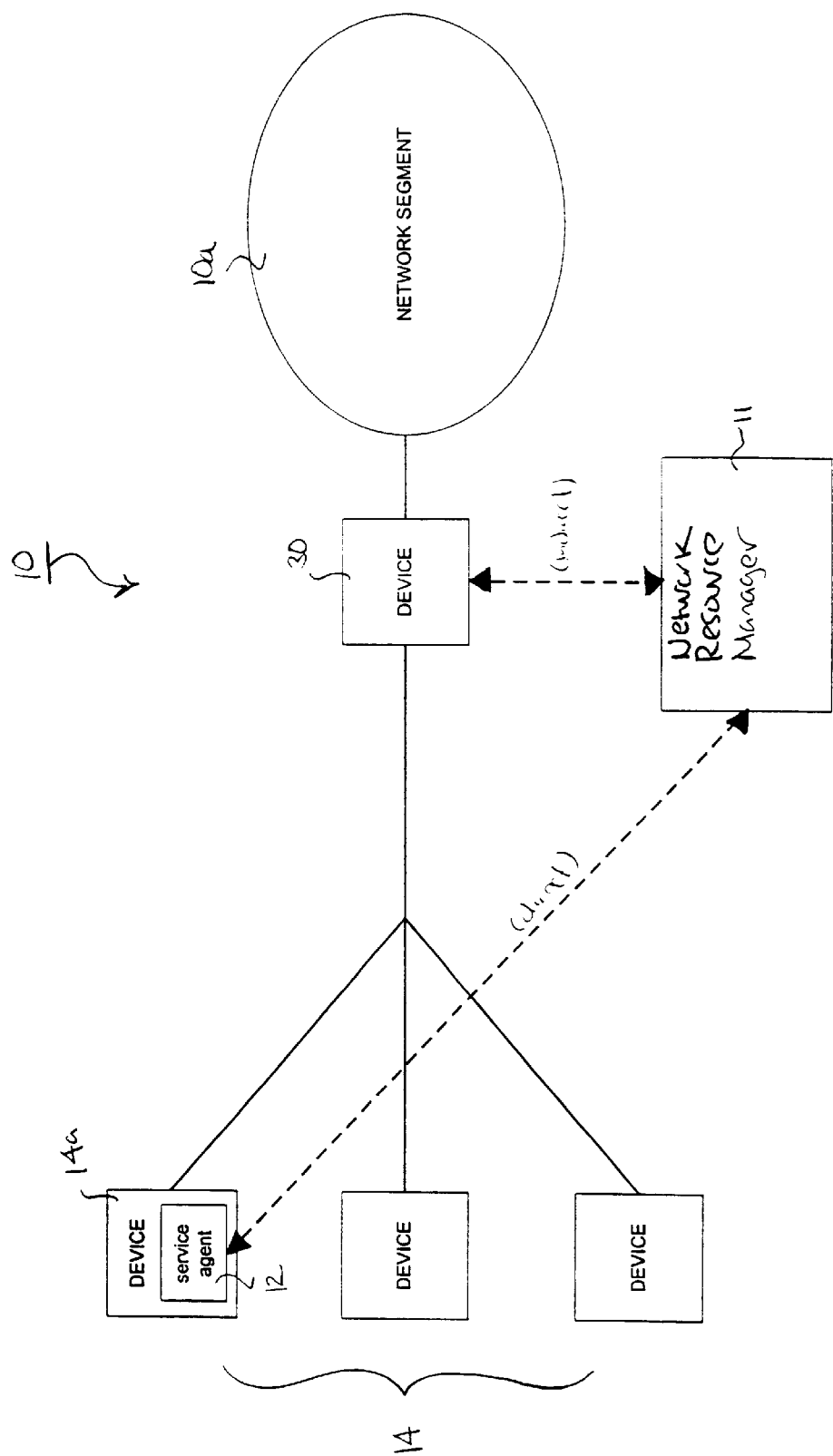
FIG. 1 is a block diagram of a network, which includes a resource manager.

Referring to FIG. 1, a network 10 is shown. Network 10 is a differentiated services network, such as the Internet, although a non-differentiated services network also may be used. A differentiated services network is a network in which different types of data packets are given different levels of priority for transmission through the network. For example, electronic commerce packet traffic or real-time packet traffic, such as streaming video, may be given higher priority than other types of packet traffic.

Network 10 includes network resource manager 11. Network resource manager 11 manages packet traffic over network 10 in accordance with specified rules, or "policies," to manage quality of service (QOS) on the network. In one embodiment, network resource manager 11 is a computer program running on one or more devices, such as a network server. Alternatively, network resource manager 11 may be implemented using programmable logic, such as an FPGA (Field Programmable Gate Array) or an ASIC (Application-Specific Integrated Circuit) embedded in a network device.

In operation, network resource manager 11 receives a "service reservation" from a service agent 12 running in one or more network devices 14. Network devices 14 may be individual personal computers (PCs) or other computing devices. Each device may run a separate copy of service agent 12 or service agent 12 may be run on several devices. The service reservation may be made through direct communication with the resource manager or indirectly by signaling through the network using an appropriate protocol, such as RSVP (Resource Reservation Protocol). In the case of indirect signaling, device 30 (of FIG. 1) receives the service reservation and outsources admission control to the resource manager using a protocol, such as COPS/RSVP (Common Open Policy Service—Resource Reservation Protocol).

The service reservation includes a request for a particular network service, such as bandwidth. For example, in one embodiment, the service reservation contains the following data: a network service type, token bucket parameters (e.g., sustained packet rate, peak packet rate, and bucket size), a service agent/user identifier (e.g., the service agent's network address, and encrypted user credential, or the like), a source identifier, such as an IP (Internet Protocol) address corresponding to the source of a packet transfer, and a destination identifier such the IP address corresponding to the destination of the packet transfer. The resource manager is not limited in this regard however, and the network service reservation may contain an additional or more limited amount of data depending upon the functionality and features available on the network resource manager. Optionally, the service reservation may also contain data specifying the time/duration during which resources for the service reservation are to be allocated; an authentication key for use in encrypting/decrypting the service reservation; a priority; and any other type of information that may be useful to the network resource manager in implementing network service reservations.

The service reservation is based on the size of the packet, the rate of transmission, and the class of service (CoS) of the packets being transferred. CoS defines the level of priority a packet is to be given during transmission through network 10. The CoS of a packet may be specified by marking the packet's header or otherwise modifying the packet's header so that the header becomes indicative of the relative priority of the packet. In this manner, higher priority packets may be given a higher priority during data transmission than lower priority packets.

Figure 2:
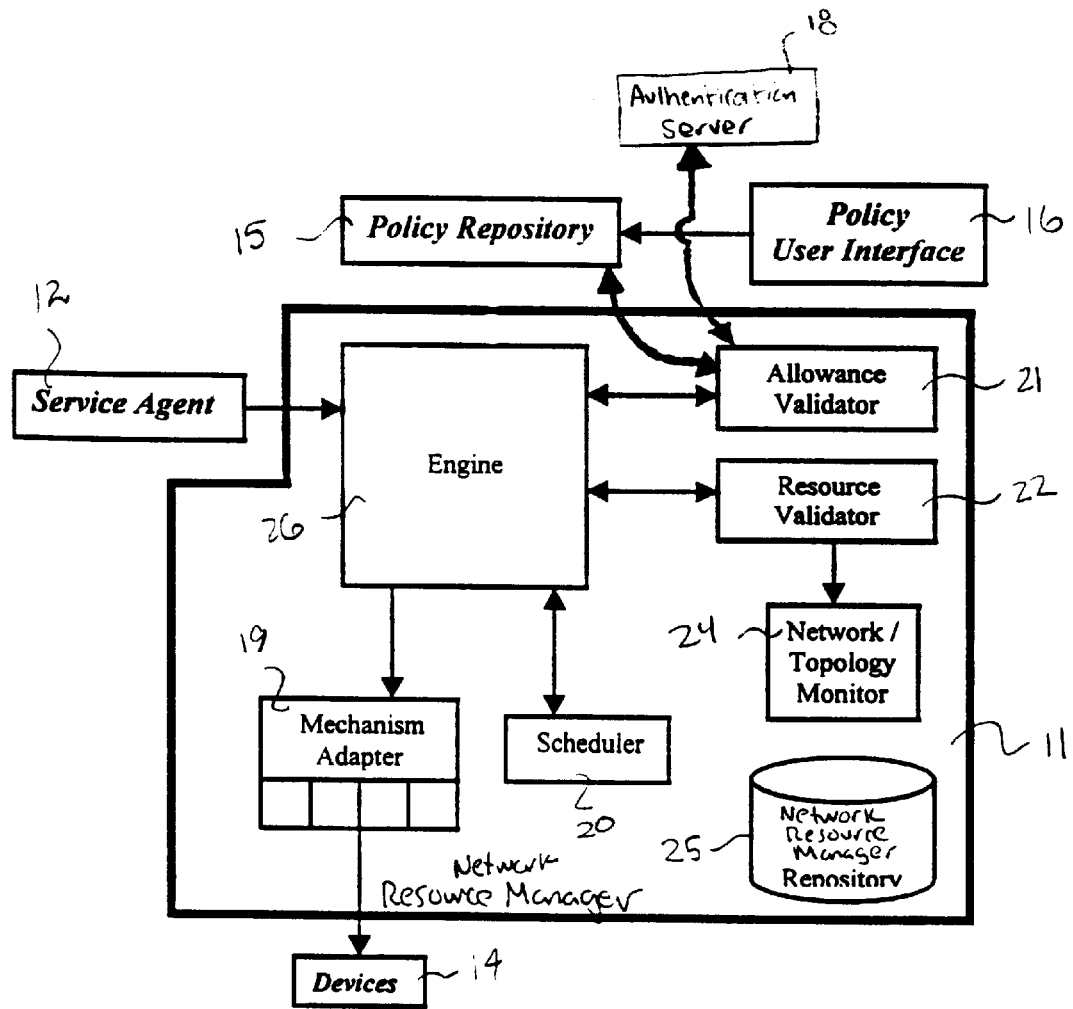
FIG. 2 is a block diagram showing the software architecture of the resource manager.

Referring to FIG. 2, upon receiving a network service reservation, network resource manager 11 consults policies stored in policy repository 15 to determine if the service reservation should be granted or denied. Policy repository 15 is a memory or other storage device on network 10 that stores data for managing, accessing, and manipulating policies to provide specific network services.

Policy repository 15 includes a directory having data that defines policies for network 10. For example, the data may include network user data, network group data (meaning those users contained in predefined groups of network users), network service data, service reservations associated with pre-configured data packet flows, authentication data, and service provisions. A service provision is a set of rules that govern who on network 10 can request a service (called "authorization") and the maximum amount of network services available to a requester or for a particular CoS (called "allowance"). A service provision includes data defining the user or group of users requesting service and, possibly, one or more of: a list of authorized services for the user or group and an association of a maximum number of instances of the service. Additional classes of data may also be included, and the resource manager is not limited to using this particular data or to a system configured to use only the listed data. In one embodiment, the directory in the policy repository is an LDAP-accessible directory, although other directories may be used.

A network administrator, or any other authorized user, may define the policies in policy repository 15. There are no limitations on the policies that may be defined, save for those inherent in the configuration of network 10. For example, policies may define available network services, service reservations for a specified time period, service reservations that are always active, service provisions that authorize reservations based on the identity of a user, and a maximum amount of services available to the user. Thus, for example, a network administrator can define policies indicating the time of day that an application, a user, or a group of users can access network resources (e.g., bandwidth) and/or the level of service (e.g., the amount of bandwidth) that can be accessed by that application, user, or group of users. Data is entered into policy repository 15 via policy user interface 16. Policy user interface 16 may be accessed via a network administrator's computer, which could be a stand-alone computer or one or more computers.

Network resource manager 11 communicates with policy repository 15 to access policies and other data using a suitable protocol. In one embodiment, communication takes place via LDAP (Lightweight Directory Access Protocol). Network resource manager 11 registers with policy repository 15 in order to retrieve policies and receive notification of policy changes.

Resource manager 11, more specifically allowance validator 21, communicates with authentication server 18 to determine whether the service agent/user is a valid entity and is allowed to make service reservations. In one embodiment, authentication server 18 is a Kerberos server.

As shown in FIG. 2, network resource manager 11 also includes mechanism adapter 19, scheduler 20, resource validator 22, network topology monitor 24, network resource manager repository 25, and engine 26. It is noted that other embodiments may combine and/or omit one or more of these elements, depending upon the functionality desired. In any case, the network resource manager is not limited to this particular software/hardware architecture.

Figure 3:
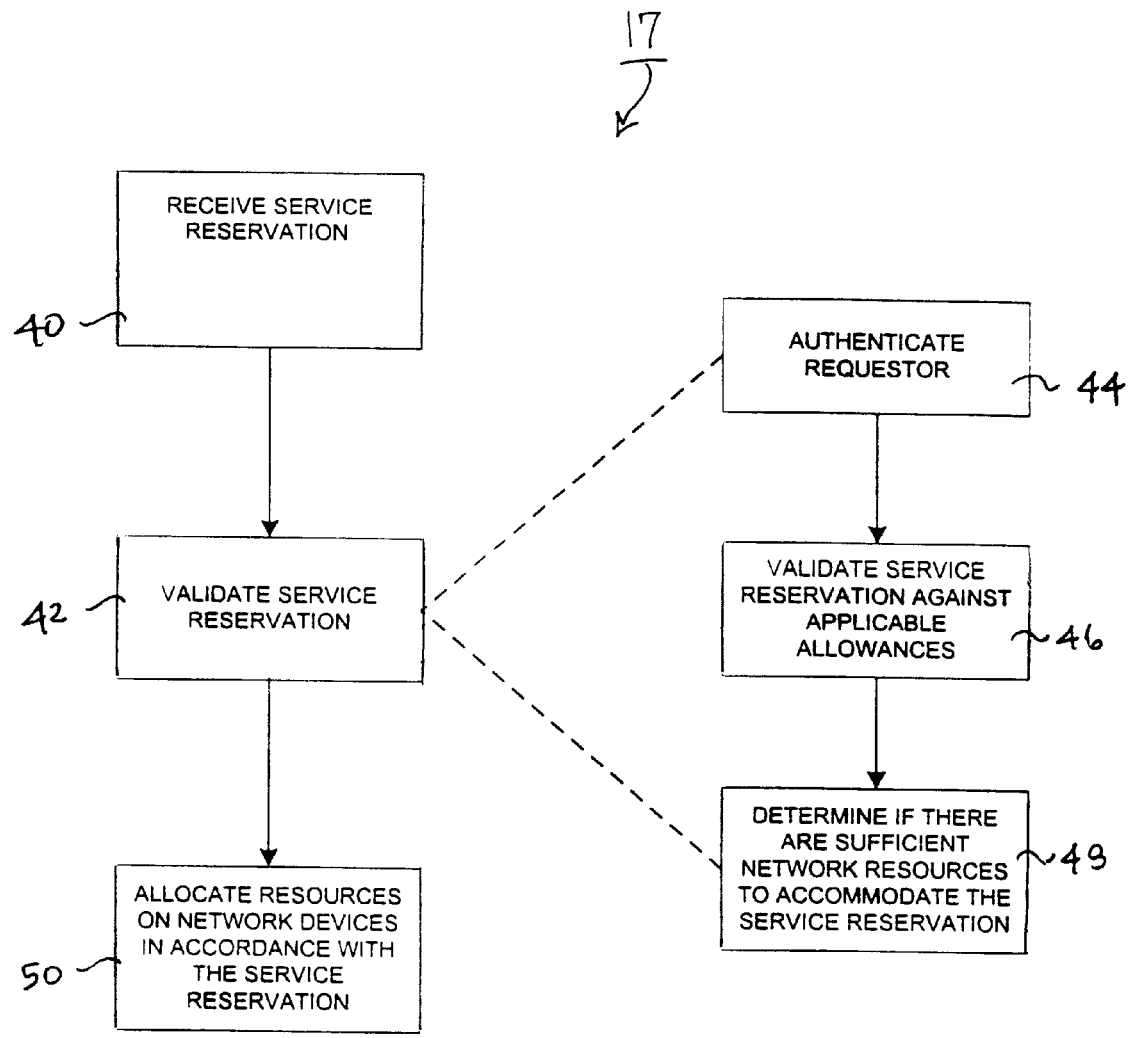
FIG. 3 is a flowchart showing a process for allocating network resources using the resource manager.

Referring to FIG. 3, a process 17 that executes in engine 26 for allocating resources on a network is shown. Engine 26 is the control center of network resource manager 11. Engine 26 accepts service reservations, extends existing reservations, and deactivates reservations. Engine 26 interacts with service agent 12 to receive service reservations from applications running on network devices; with mechanism adapter 19 to receive implicit service reservations from devices that signal their requests through the network using protocols such as RSVP; and with allowance validator 21 to authenticate service reservation requestors and to authorize service reservations. Allowance validator 21 interacts with policy repository 15 to retrieve policies that control the allocation of network services. Engine 26 also interacts with resource validator 22 to validate service reservations based on the availability of network resources; with scheduler 20 to queue service reservations for future activation; and with mechanism adapter 19 to monitor network devices and to install service reservations on network devices.

Figure 4:
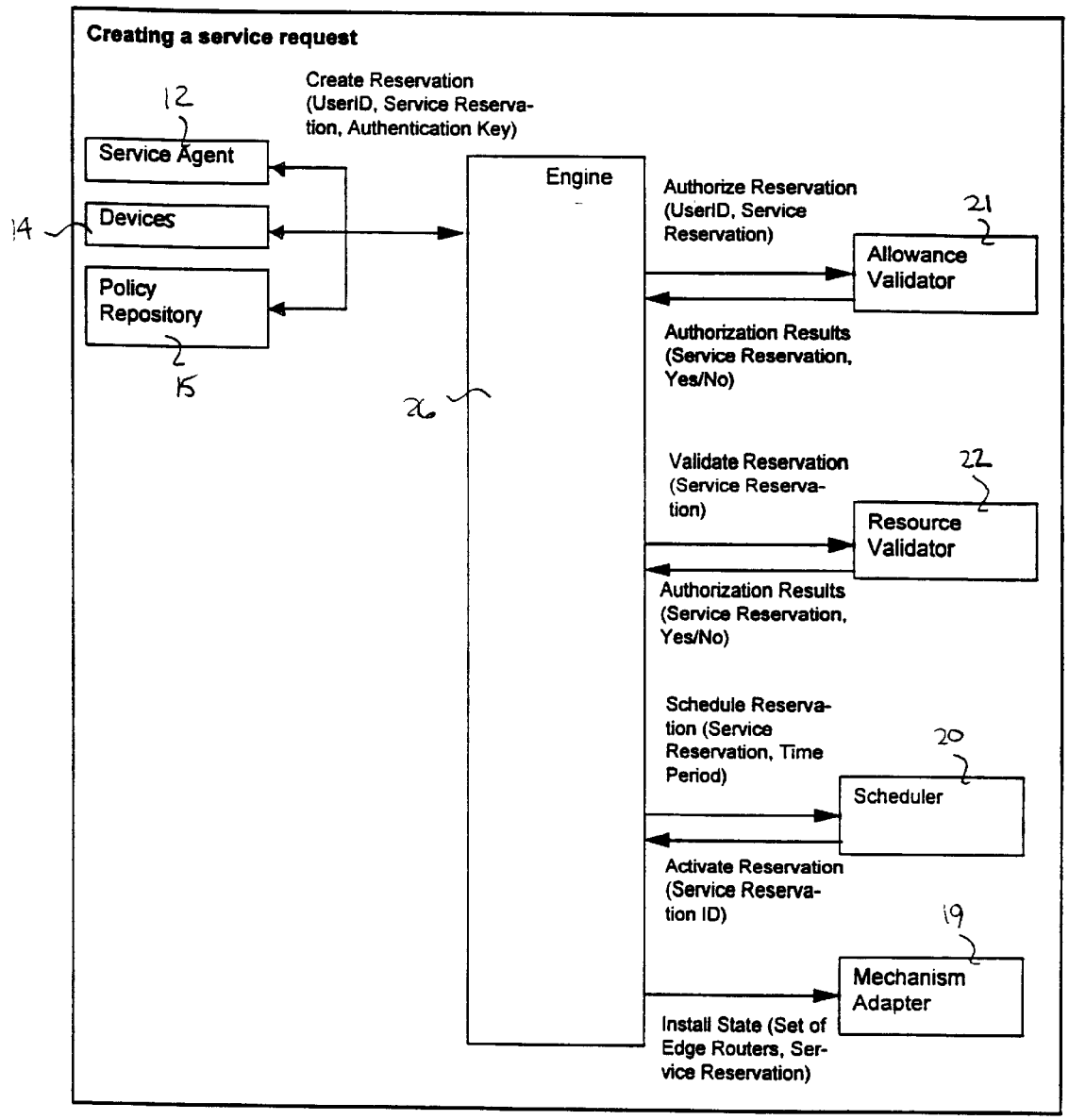

As shown in FIG. 4, service agent 12, policy repository 15, and/or network devices 14 may cause engine 26 to produce or to extend service reservations. Referring to FIG. 3, engine 26 receives (40) service reservations and passes these requested service reservations to allowance validator 21 and resource validator 22, both of which validate (42) the requested service reservations. In particular, allowance validator 21 authenticates (44) the requester, validates the reservation against applicable allowances (46), and informs engine 26 of the results. If allowance validator 21 determines that a reservation is valid, engine 26 passes the reservation to resource validator 22. Resource validator 22 validates (48) the reservation against available network resources. That is, resource validator 22 determines if there are sufficient network resources to accommodate the reservation. Resource validator 22 informs engine 26 of the results of its analysis.

Reservations that have passed validation by both allowance validator 21 and resource validator 22 are passed to mechanism adapter 19. Mechanism adapter 19 communicates with policy enforcement points (PEPs), such as network devices, applications, etc. that are necessary to allocate (50) resources to satisfy the requested service reservation. Valid "future" service reservations are forwarded to scheduler 20.

In this regard, a service reservation can be requested for current or future activation. If the service reservation is requested for future activation, engine 26 passes the reservation to scheduler 20, which schedules the reservation for future activation. At the time the reservation becomes due, scheduler 20 notifies engine 26 which, in turn, passes the reservation to mechanism adapter 19 for processing, as described below.

Figure 5:
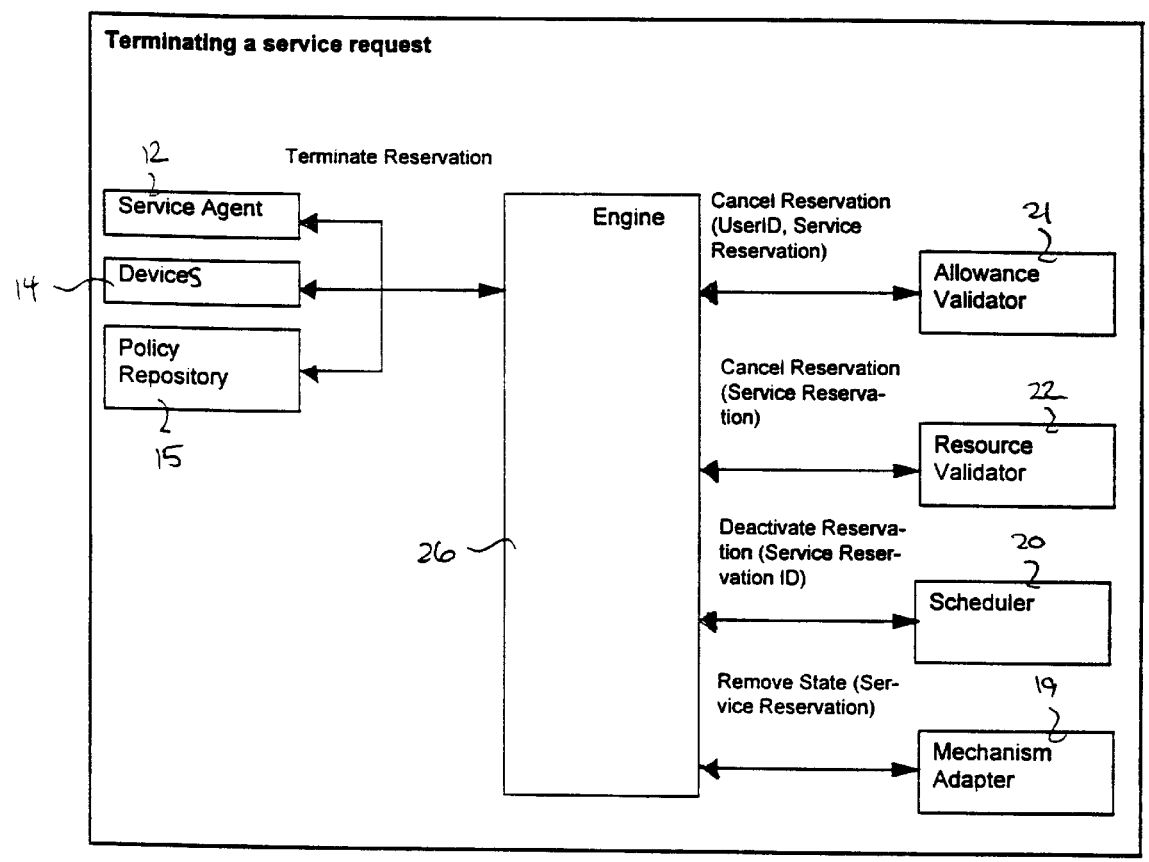

Referring to FIG. 5, engine 26 also receives reservation cancellations from service agent 12, network devices 14, and/or policy repository 15. In response to these cancellations, engine 26 notifies allowance validator 21 and resource validator 22 which, in turn, cancel any ongoing processes relating to a cancelled reservation. Engine 26 instructs mechanism adapter 19 to remove the cancelled reservation from the appropriate network PEPs and instructs scheduler 20 to deactivate the cancelled reservation if the cancelled reservation is a future reservation.

Figure 6:
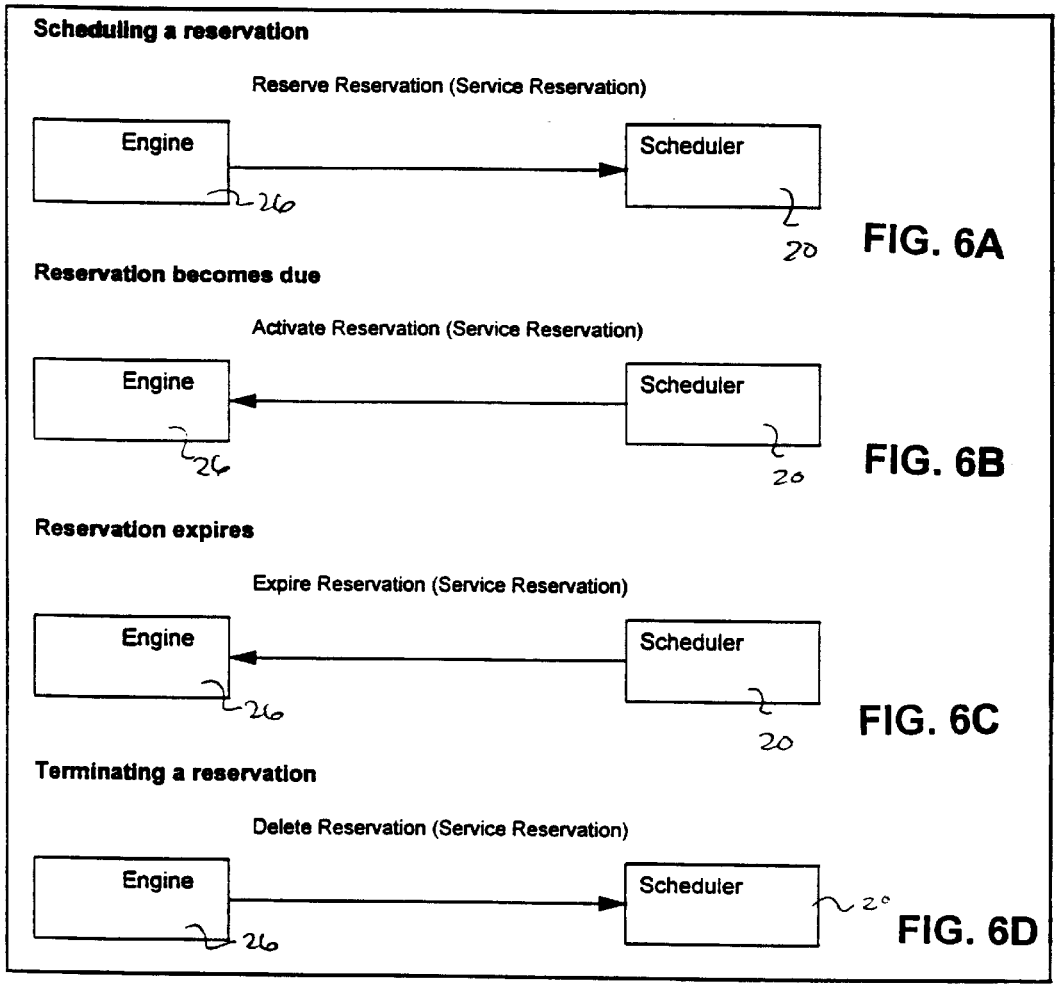

As noted, scheduler 20 receives and maintains data relating to future service reservations, as well as the end and lease times for current reservations. As shown in FIG. 6, once a future service reservation has been validated by allowance validator 21 and resource validator 22, engine 26 passes the reservation to scheduler 20 (FIG. 6A). Scheduler 20 receives the reservation and, when the reservation becomes due, scheduler 20 informs engine 26 and any other necessary components of network resource manager 11 (FIG. 6B). When a reservation expires, scheduler 20 informs engine 26 that the reservation should be deactivated (FIG. 6C). If a future reservation is deactivated, or an active reservation is terminated, engine 26 informs scheduler 20 (FIG. 6D). Scheduler 20 removes any events associated with such a reservation from the queue of scheduled events in network resource manager repository 25 (FIG. 7B).

Network resource manager repository 25 (FIG. 2) is accessible to each of the components of network resource manager 11, either directly or indirectly, through engine 26. Repository 25 may also store currently-allocated allowances and resources, currently-active service reservations, future allowance and resource allocations, future service reservations, auditing and accounting data, static and dynamic network topology maps, and provides a local cache for storing policy data retrieved from policy repository 15. Repository 25 may also store associations for currently-active service reservations, including the service configured for each service reservation, the amount of allowances left for each CoS per user and per group, the amount of allowances allocated for each CoS per reservation, the amount of bandwidth allocated for each CoS per link on network 10 and per reservation, and the amount of bandwidth left for each CoS per link. Optionally, repository 25 also maintains a log of events. For example, the log may contain instances of failure to meet a service reservation, changes in states of network 10, and communication failures between network devices. It is noted that resource manager 11 is not limited to storing all of the foregoing information or to storing such information in repository 25. Additional information may be stored, or,less information may be stored, as required.

Figure 7:
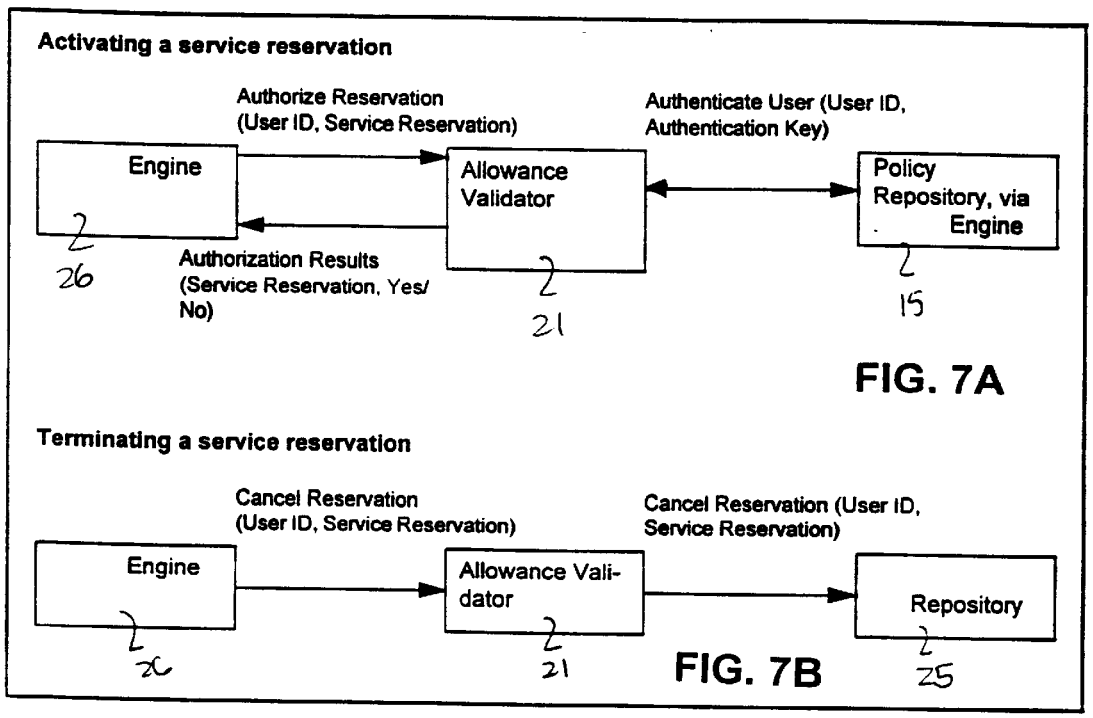
Figure 10:
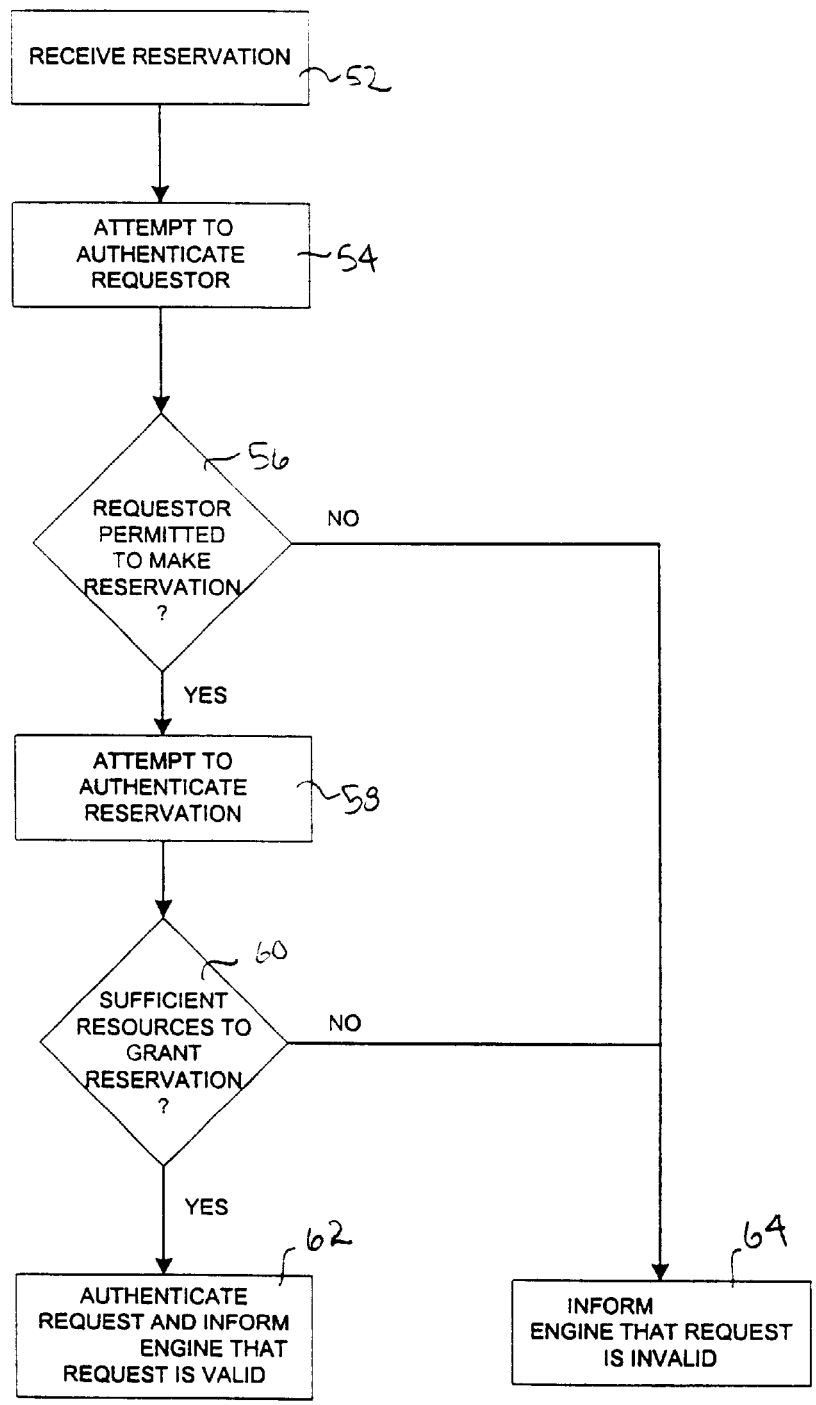
FIG. 10 is a flowchart showing a process performed in the resource manager for authenticating a requestor of network resources and for authorizing a resource reservation.

Referring to FIGS. 7 and 10, allowance validator 21 interprets policies stored in policy repository 15 to determine the overall validity of a service reservation based on allowances and the authenticity of the requester. When a current or future service reservation is requested (FIG. 7A), engine 26 passes the reservation to allowance validator 21. Allowance validator 21 receives (52) the reservation and attempts (54) to authenticate the requester. To perform authentication, allowance validator 21 uses identification data present in the request, such as the requestor's IP (Internet Protocol) address or encrypted user credential, performs a query against authentication server 17, and compares the results against data from policy repository 15 indicating whether the user identified by the identification data is permitted to make a reservation of network resources.

If allowance validator 21 determines (56) that the requester is permitted to make the reservation, allowance validator 21 attempts (58) to authorize the service reservation. To perform this authorization, allowance validator 21 compares the current service usage on network 10 with applicable user, group and service allowances. The current service usage on network 10 is stored in, and retrieved from, repository 25. For example, allowance validator 21 may compare the current service usage for a particular CoS with the service allowance for that CoS for the service reservation requester. If allowance validator 21 determines (60) that there are sufficient resources available to the requestor (i.e., that the requester has not already reserved the maximum amount of resources pre-allotted to the requestor), allowance validator 21 authorizes the service reservation and informs (62) engine 26 that the service reservation is valid. If the requester fails authentication (56) or authorization (60), allowance validator 21 informs (64) engine 26 that the reservation is not valid. The reservation is then not made. Alternatively, the reservation may be queued for later authorization and validation.

When a service reservation is terminated (FIG. 7B), either at completion of the service, through user cancellation, or through failure to pass resource validation (see below), engine 26 informs allowance validator 21 that the reservation is to be removed. In response, allowance validator 21 updates data in the network resource manager repository 25 indicating what services are currently in use on network 10. Optionally, when a future service reservation becomes due, engine 26 passes the reservation to allowance validator 21 for re-authentication and re-authorization. Alternatively, re-authentication and re-authorization may not be performed on the reservation. Rather, an authenticated and authorized reservation may simply be made when it becomes due.

Figure 11:
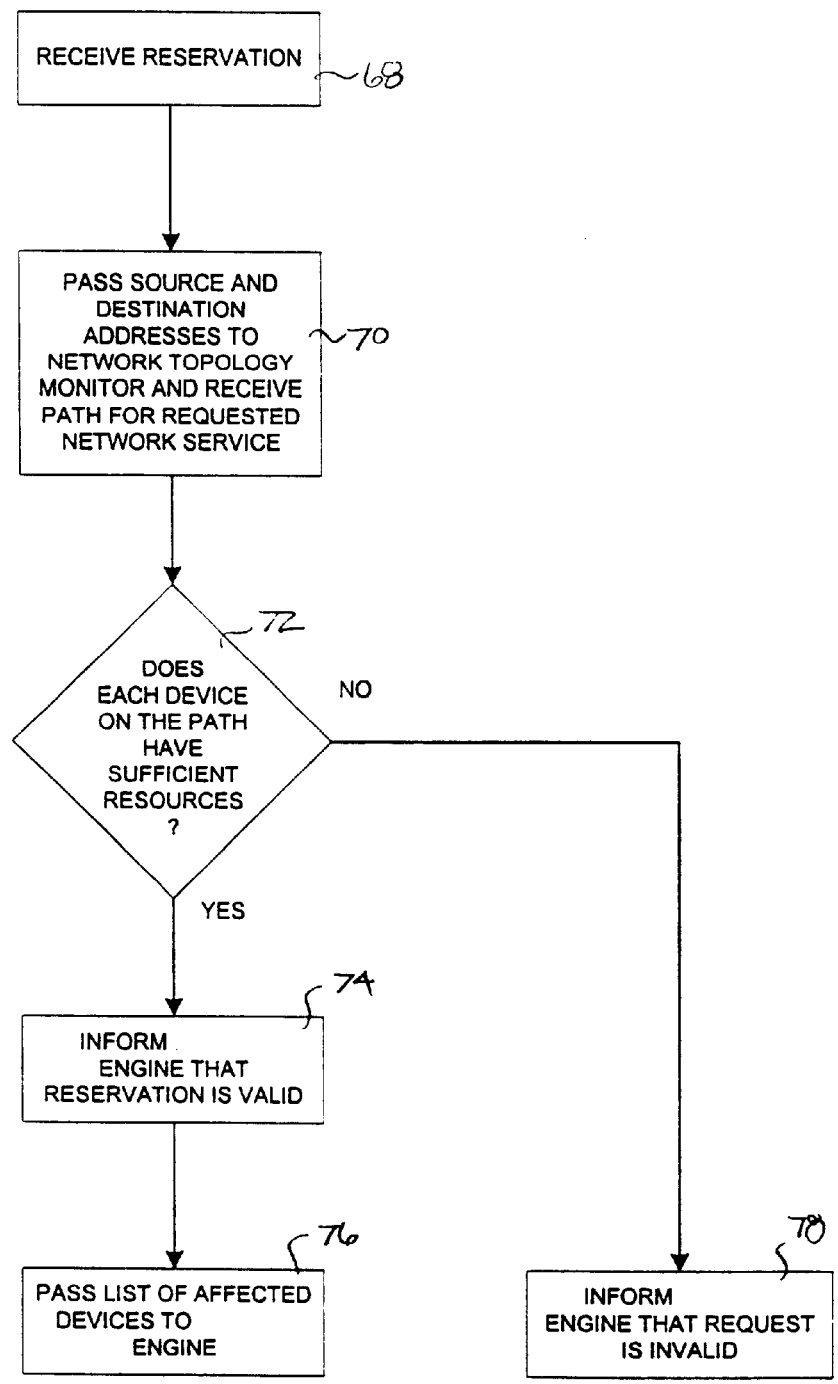
FIG. 11 is a flowchart showing a process performed in the resource manager for determining if there are sufficient network resources to accommodate the service reservation.

Referring to FIGS. 8 and 11, resource validator 22 validates current and future service reservations by comparing resource requirements for the requested service against available and currently-committed resources on the network. Engine 26 passes new service reservations to resource validator 22 once they have been approved by allowance validator 21. Resource validator 22 receives (68) the new service reservations and passes (70) source and destination network addresses from the service reservations to network topology monitor 24 (see below). Network topology monitor 24 obtains a path(s) for the requested service. For example, network topology monitor 25 may perform the Dijkstra shortest-path process using link data received from a link state protocol such as OSPF (Open Shortest Path First). Network topology monitor 24 then provides that path to resource validator 22, where the path is received. Resource manager 11 is not limited to use with OSPF. Rather, any link state protocol may be used, another example of which is the IS-IS (Intermediate System to Intermediate System) protocol.

To validate a service reservation, resource validator 22 determines (72) if links along the path determined by network topology monitor 24 have sufficient available resources to accommodate the requested service. For example, if the service reservation is for bandwidth on network 10, resource validator 22 determines, based on current network and device bandwidth data, whether each link (e.g., device) along the path on network 10 has sufficient bandwidth to accommodate the service reservation.

Certain links within the network topology may be validated, while other links are ignored. That is, resource manager 11 may not manage links to certain network devices, depending, e.g., on the bandwidth available in those links (which may be determined by the resource manager or stored beforehand). This is useful if some links have a relatively high capacity and, thus, do not need to be managed by resource manager 11. Whether a link needs to be managed may be determined by the destination address of a packet. That is, if the packet is to be transferred over a high bandwidth path, then resource manager may simply transfer the packet, without allocating bandwidth along the path.

If there are sufficient available resources in each link (e.g., device) to accommodate the current service reservation, resource validator 22 responds (74) to engine 26 that the reservation is valid. In the case of a valid reservation, resource validator 22 also passes (76) to engine 26 a list of network devices that are affected by the reservation. Network devices that are affected include those along the path determined by network topology monitor 24. If there are not sufficient network resources available to accommodate the service reservation (72), resource validator 22 responds (78) to engine 26 with an indication that the service reservation is not valid. The reservation is then not made. Alternatively, another path, e.g., a path that is not the shortest path through the network, may be mapped, and that path tested to see if it contains sufficient network resources to accommodate the service reservation. If so, the reservation may be made on that new path.

In the event of a change in the topology of the network, network topology monitor 24 informs resource validator 22 of the change. Resource validator 22 uses this data to determine if the change affects any active service reservations on network 10 (obtained from repository 25). If an active service reservation is adversely affected by the change in network topology, resource validator 22 instructs engine 26 to terminate the current service and updates current resource allocation data in repository 25. Resource validator 22 may also determine if a change in the topology of the network will affect any reservations that have not yet come due and, if so, resource validator 22 instructs engine 26 to consider alternative paths through the network for the not-yet-due reservations.

Network topology monitor 24 detects changes in the topology of network 10 and supports automatic discovery of devices on network 10. Network topology monitor 24 also monitors link states of the devices on network 10 and uses these link states to determine the shortest path(s) available between source and destination network addresses. Alternatively, other paths, such as the least loss path may also be determined. Network topology monitor 24 obtains the link states of devices on network 10 using a link-state protocol such as OSPF or IS-IS, and also obtains a maximum bandwidth per link via mechanism adapter 19. The maximum bandwidth per link may also be provisioned through a command-line interface on the resource manager or stored within the policy repository. This data is mapped to links in network 10 and is used to update the dynamic topology map of network 10 stored in repository 25.

Network topology monitor 24 determines a path based on dynamic (i.e., current) topology data that it learns from the network. Network topology monitor 24 is able to maintain the current dynamic topology since it is informed of link state changes by the link-state protocol it is using. The dynamic network topology map is updated based on those link state changes.

Network topology monitor 24 may also be provisioned statically (i.e. network 10's topology is described manually), through the resource manager's command-line interface or through the policy repository. The network topology stored within network topology monitor 24 may be a combination of dynamic (automatically learned) information and static (manual) information. Network topology monitor 24 merges the information learned with the information entered manually to come up with a consistent network topology.

Mechanism adapter 19 issues queries for device states and links and provides an interface for any components of network resource manager 11 that require device state and link data. Mechanism adapter 19 also activates and deactivates service reservations at network devices by configuring those devices to support services on network 10. Configuration is performed by installing IP traffic filters, flow identifiers, and/or CoS parameters on each network device (or, more generally, PEP) on the path determined by network topology monitor 24. For example, if a service reservation specifies that packets from a particular network address having one CoS (e.g., high priority packets) are to be given access to bandwidth before packets from that same network address having another CoS (e.g., low priority packets), mechanism adapter 19 installs appropriate filters, flow identifiers, and CoS parameters on each PEP (e.g., network device) in the path determined by network topology monitor 24. Mechanism adapter 19 may also implement a request/response protocol such as COPS/RSVP, in which case the activation and deactivation of service reservations is performed by responding to a device's request for service. This method of activation and deactivation may be used in parallel with a method of activation and deactivation that installs IP traffic filters.

For an active service reservation, mechanism adapter 19 maintains the state of devices configured for the reservation. Mechanism adapter 19 also handles deactivation and deletion of service reservations. Deactivating and deleting service reservations involves removing reservations artifacts for the designated reservations from the network devices.

Mechanism adapter 19 communicates with network devices via one or more protocols. Examples of protocols that may be used to effect such communication include SNMP (Simple Network Management Protocol), COPS-RSVP, COPS-PR (Common Open Policy Service—Provisioning), and CLI (Command Line Interface). SNMP is a network monitoring and control protocol. COPS is a query response protocol used to exchange policy data between a network policy server and a set of clients. RSVP is a communication protocol that signals a router to reserve bandwidth for real-time transmission of data. CLI is an interface that is employed when a user is logged onto a network device directly. It is noted that the resource manager is not limited to use with the foregoing protocols and that all such protocols are not required.

Referring to FIG. 9, when a service reservation becomes due (e.g., a current reservation has been received or the time for processing a future reservation has arrived), engine 26 instructs mechanism adapter 19 to activate the service (FIG. 9A). Engine 26 provides mechanism adapter 19 with the list of devices affected by the reservation, which was received from resource validator 22. Mechanism adapter 19 communicates with those network devices 14 to provide the network devices with the filters, flow identifiers, CoS parameters, and/or any other items that are required to implement the service. If a protocol such as COPS/RSVP is used, mechanism adapter 19 responds to the device with a message to install the reservation if the reservation is a current reservation. If the reservation is a future reservation, mechanism adapter 19 implements an "RSVP rendezvous," in which case it waits for the device to make a request through COPS/RSVP before mechanism adapter 19 gives a positive response. Since it may be possible that the original future reservation did not contain all the data required to perform resource and allowance validation (i.e. a future reservation may specify only the source network address of the packet transfer and the service agent's credentials), when the device makes its request, mechanism adapter 19 may have to perform resource and/or allowance validation on the request.

When a service reservation terminates (FIG. 9B), engine 26 instructs mechanism adapter 19 to deactivate the service. In response, mechanism adapter 19 communicates with the necessary network devices 14 to remove any configuration data specific to the deactivated service. When the state of a network device changes, mechanism adapter 19 notifies listening components, such as network topology monitor 24, within network resource manager 11. If a protocol such as COPS/RSVP is used, mechanism adapter 19 sends an unsolicited message to the device to remove a reservation.

II. Segment Tree Data Structures

As noted above, scheduler 20 stores current and future service reservations in repository 25. Time duration data for these service reservations is stored in a segment tree data structure, as described below.

A. Reservation-Specific Segment Trees

Figure 12:
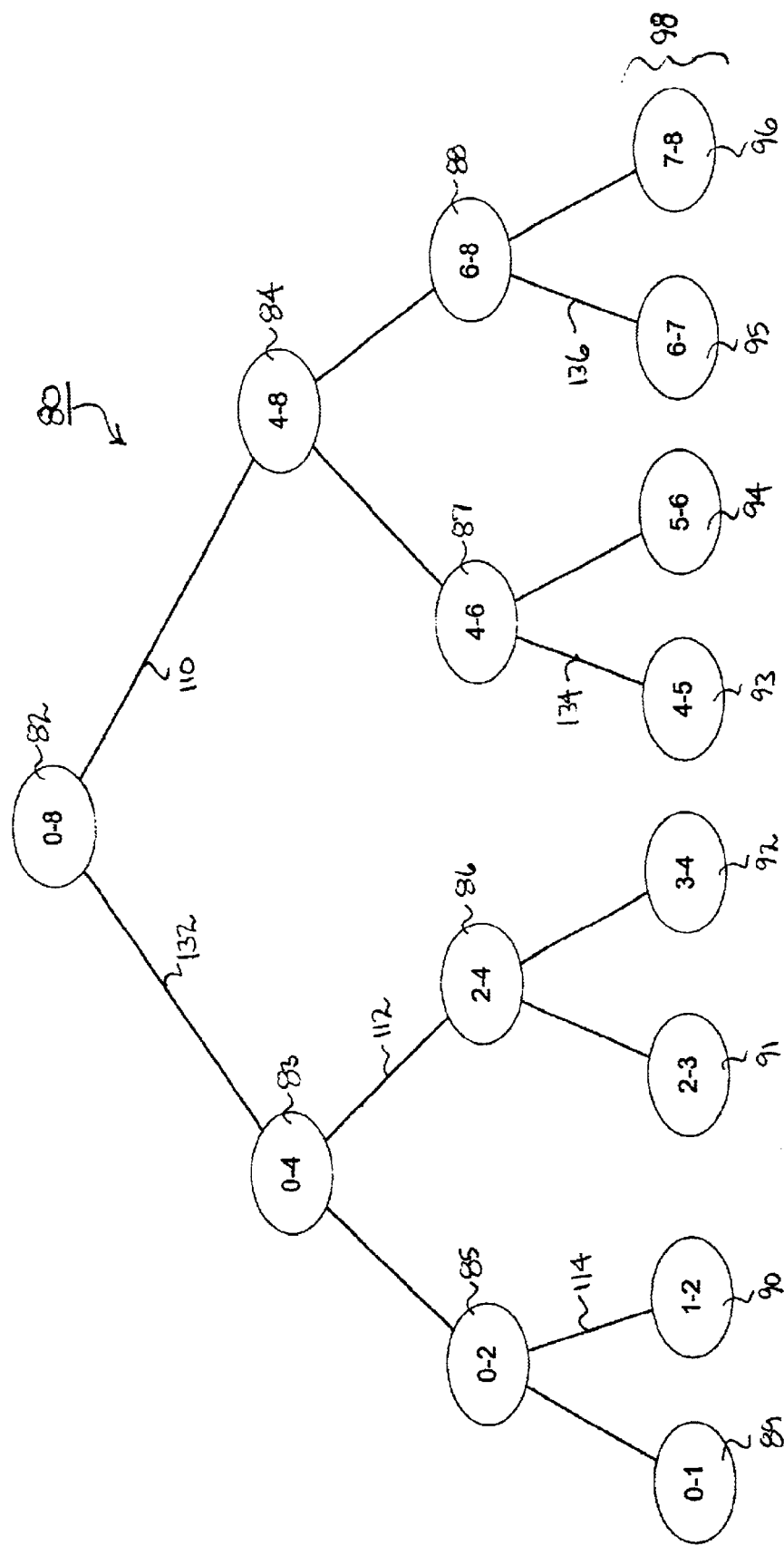
FIG. 12 shows a fully-subdivided segment tree data structure.

Referring to FIG. 12, an example of a segment tree data structure 80 for storing time duration data for network service reservations is shown. Segment tree data structure 80 includes parent node 82 and various descendent nodes 83 to 96. Descendent nodes 83 to 96 include child nodes 83, 84, grandchild nodes 85 to 88, and so on. Segment tree data structure 80 includes four levels or "generations"; however, any number of levels may be incorporated into a segment tree data structure.

Each node in segment tree data structure 80 corresponds to a time duration of a network service reservation. The time duration for each node is set when that node is generated. The time duration may be defined by {s,t} or {s-t}, where "s" corresponds to a start time and "t" corresponds to an end time. For example, parent node 82 may have a time duration of "0–8," which may represent zero to eight hours, 12:00 PM to 8:00 PM, or whatever convention is desired. The descendent nodes each have time durations that correspond to a portion of the time duration of the parent node. For example, child nodes 83 and 84 have durations of "0–4" and "4–8," respectively, which, when combined, total the duration of parent node 82, namely "0–8."

To generate descendent nodes 83 to 96, the duration of parent node 82 is subdivided (e.g., recursively split), usually into two equal halves, although subdividing may include splitting a node into more than two nodes. Also, the duration of parent node 82 may be subdivided into two or more non-equal parts, as desired. The resulting child nodes 83 and 84 are then subdivided, usually in the same manner as the parent node, e.g., in half. The process is repeated until the nodes at the final level 98 of the segment tree data structure contain a desired granularity. "Granularity" in this context corresponds to the size of the time duration represented by the nodes in the final level 98. For example, in segment tree data structure 80, final level 98 has a granularity of one (e.g., "0–1," "1–2," etc.). It is noted that the granularity is not limited to integers.

Figure 13:
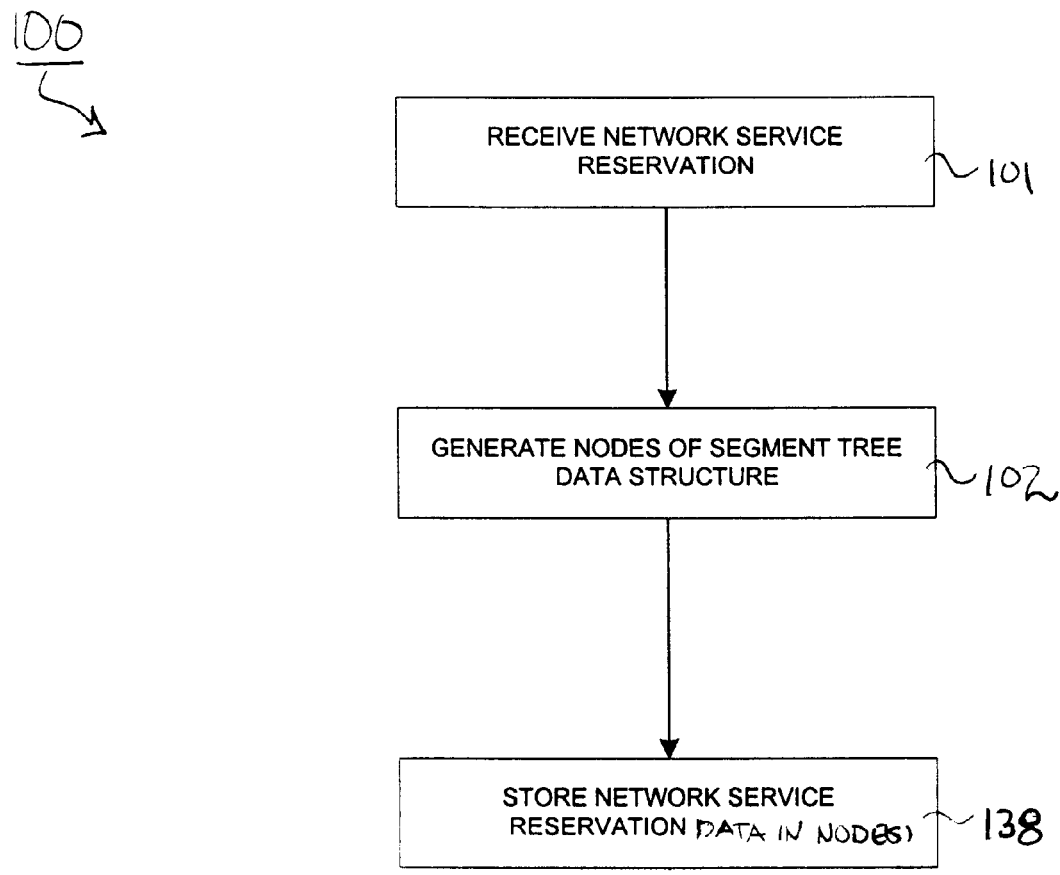
FIG. 13 is a flowchart showing a process for generating a reservation-specific segment tree data structure.

Referring to FIG. 13, a process 100 is shown for generating and using a segment tree data structure in resource manager 11. Process 100 is performed by scheduler 20 and stores the resulting segment tree data structure in resource manager repository 25 (see FIG. 2).

Process 100 receives (101) a network service reservation for a predetermined time duration. For example, the received network service reservation may correspond to time duration "0–1." Process 100 examines the received network service reservation to determine this time duration. Process 100 uses an existing parent node, such as a node corresponding to "0–8," to generate (102) a node to store time duration data for the received service reservation.

Unlike in processes for generating "conventional" segment tree data structures, process 100 generates the node for the time duration data by subdividing only those nodes that define path from the parent node to the node(s) needed to store, the time duration data. This is an advantage over conventional segment tree data structures, since fewer nodes need to be subdivided, resulting in less processing, and since less memory is required to store the resulting fewer nodes.

Figure 14:
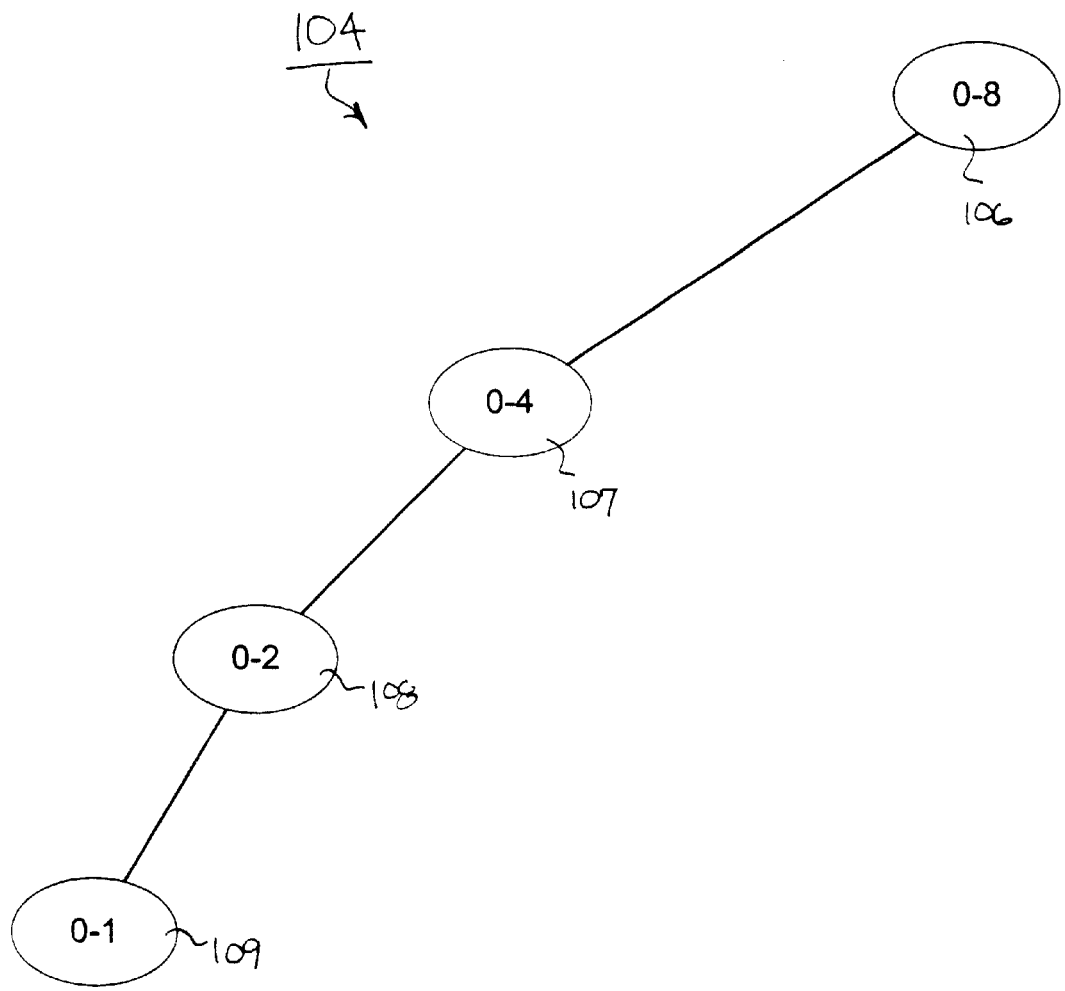
FIGS. 14 and 15 show reservation–specific segment tree data structures.

Referring to FIG. 14, a segment tree data structure 104 generated according to process 100 is shown. Segment tree data structure 104 includes parent node 106 and descendent nodes 107 to 109. As depicted, the only nodes that are subdivided are those nodes on the path between parent node 106 and the resulting final node 109 for the "0–1" service reservation. So, for example, parent node 106 ("0–8") is subdivided to obtain child node 107 ("0–4"), whereafter child node is subdivided to obtain grandchild node 108 ("0–2"). Finally, grandchild node 108 ("0–2") is subdivided to obtain final node 109 ("0–1"), which corresponds to the time duration of the received service reservation.

Nodes that are along potential branches of segment tree data structure 104, but that are not on paths from parent node 106 to final node 109, are not subdivided. For example, referring back to FIG. 12, nodes along branches 110, 112 and 114 are not subdivided by process 100 because they are not on the path from parent node 106 to descendent node 109. Only generating nodes that are needed to store the time duration data for the network service reservation decreases the amount of processing time and energy required to generate segment tree data structure 104 and the amount of memory required to store segment tree data structure 104.

Figure 15:
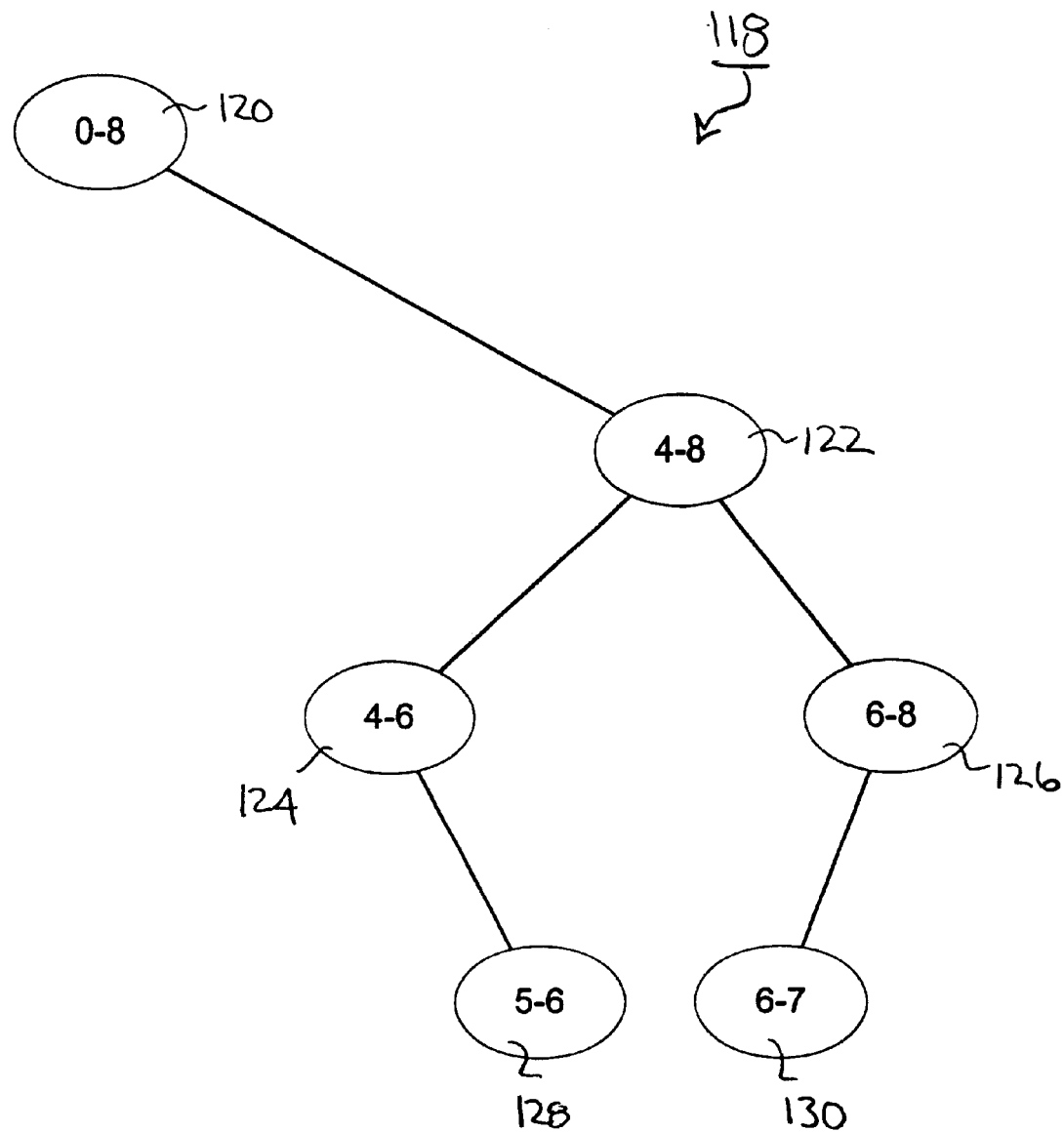

Referring to FIG. 15, another example of a segment tree data structure 118 generated according to process 100 is shown. Segment tree data structure 118 is generated for a case where the time duration of the received network service reservation covers more than one final node. More specifically, segment tree data structure nodes should each have a granularity that makes it possible to cover, without exceeding, a duration of a received service reservation. Thus, if the time duration of a network service reservation cannot be covered, without exceeding, a single node, the time duration of the service reservation is stored over more than one node, with each of the nodes covering a portion of the duration of the reservation. When combined, these nodes have a total duration that corresponds to the time duration of the received network service reservation.

Thus, in FIG. 15, if a received network service reservation is for time duration "5–7," parent node 120 is subdivided to obtain child node 122. Child node 122 is subdivided to obtain grandchild nodes 124 and 126. Neither of these grandchild nodes can cover, without exceeding, a time duration between "5–7." Therefore, each of grandchild nodes 124 and 126 is subdivided to obtain final nodes 128 and 130, respectively. When final nodes 128 and 130 are combined, they do cover, without exceeding, time duration "5–7." Referring back to FIG. 12, in this example, subdivisions are not performed along potential branches 132, 134 and 136, since those branches are not along paths between parent node 120 and final nodes 128 and 130.

Referring back to FIG. 13, process 100 stores (138) data from the received network service reservation (though not necessarily the entire service reservation) in an appropriate segment tree data structure in repository 25. The data from the service reservation includes, but is not limited to, required bandwidth and number of applications for the service reservation. The time duration data identifies the duration of the service reservation.

B. Resetting Segment Tree Nodes

Figure 16:
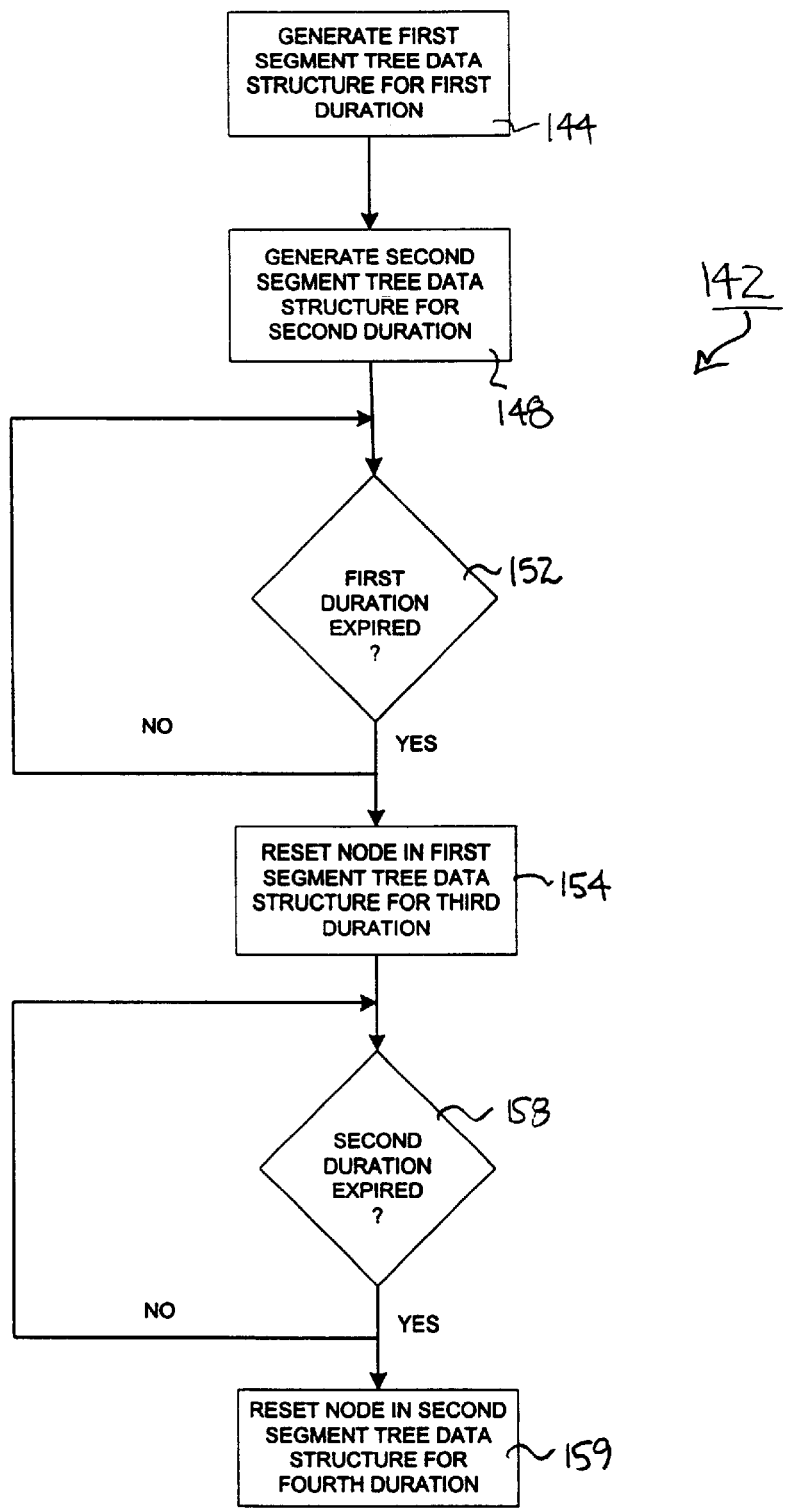
FIG. 16 is a flowchart showing a process for resetting nodes of a segment tree data structure.

Referring to FIG. 16, a process 142 is shown for populating nodes in segment tree data structures. Process 142 is performed by scheduler 20 and stores the resulting segment tree data structure in resource manager repository 25. Process 142 is advantageous because it resets data in existing segment tree data structures, thereby reducing the need to re-generate an entirely new data structure for new data.

Figure 17A:
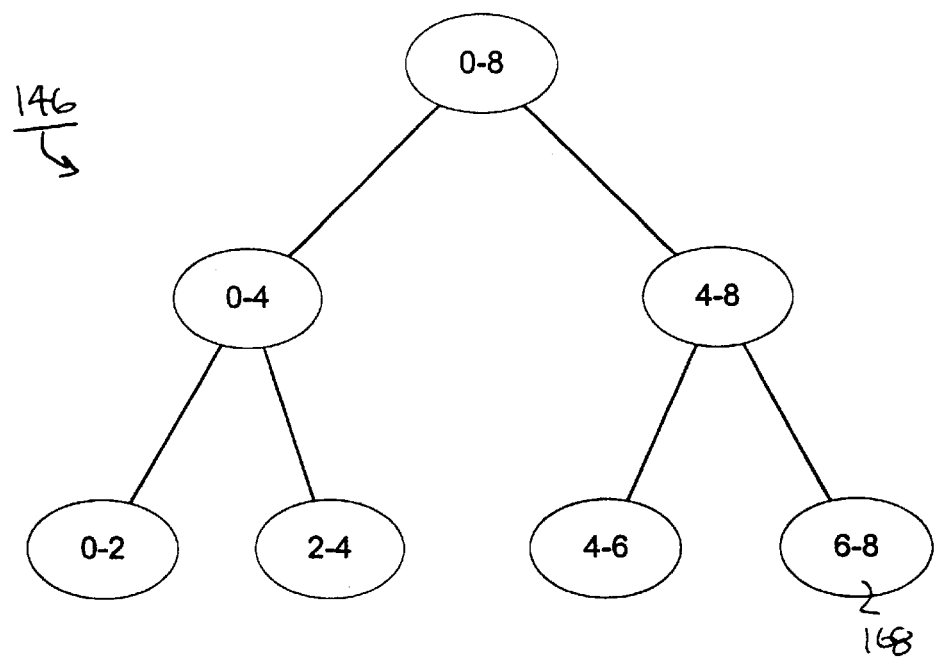
FIGS. 17A and 17B show original segment tree data structures and FIGS. 17C and 17D show reset versions of the segment tree data structures of FIGS. 17A and 17B, respectively.

Process 142 generates (144) a first segment tree data structure 146 (FIG. 17A) and stores that segment tree data structure in resource manager repository 25. Segment tree data structure 146 may be a reservation-specific segment tree data structure generated according to process 100 or segment tree data structure 146 may be a fully-subdivided segment tree data structure like that shown in FIG. 12. The latter is depicted in FIG. 17A. Segment tree data structure 146 includes nodes covering an initial time duration, such as "0–8" in the example shown.

Process 142 generates (148) a second segment tree data structure 150 (FIG. 17B), which may be a fully-subdivided segment tree data structure as shown, or a segment tree data structure generated according to process 100. Segment tree data structure 150 includes nodes covering a time duration that follows the initial time duration of segment tree data structure 146. For example, segment tree data structure 150 may have nodes that may cover the "8–16" time duration.

In process 142, following expiration of the first time duration (152), in this case "0–8," process 142 resets (154) nodes in segment tree data structure 146 to cover a time duration that follows the third time duration. Thus, as shown in FIG. 17C, process 142 resets segment tree data structure 146 to cover time duration "16–24," which is the time duration immediately following time duration "8–16" in segment tree data structure 150.

In this way, the same memory (e.g., in resource manager repository 25) may be re-used or "re-cycled" to store segment tree data structures covering different time durations. Following expiration of the second time duration (158), in this case "8–16," segment tree data structure 150 may be reset (159) to cover a next time duration, such as "24–32" (FIG. 17D). Time duration "24–32" follows time duration "16–24."

In this way, segment tree data structures 146 and 150 may be continuously reset following expiration of their respective time durations. Resetting the segment tree data structures in this manner reduces the amount of memory needed to store segment tree data structures and the amount of processing time needed to generate the segment tree data structures. This is so because existing segment tree data structures can be used.

Although only two segment tree data structures are shown, more than two may be generated and recycled as per process 142. Also, segment tree data structures can be generated which store non-consecutive time durations. For example, segment tree data structure 146 may store 16 to 24 and segment tree data structure 150 may store 32 to 40.

Figure 18:
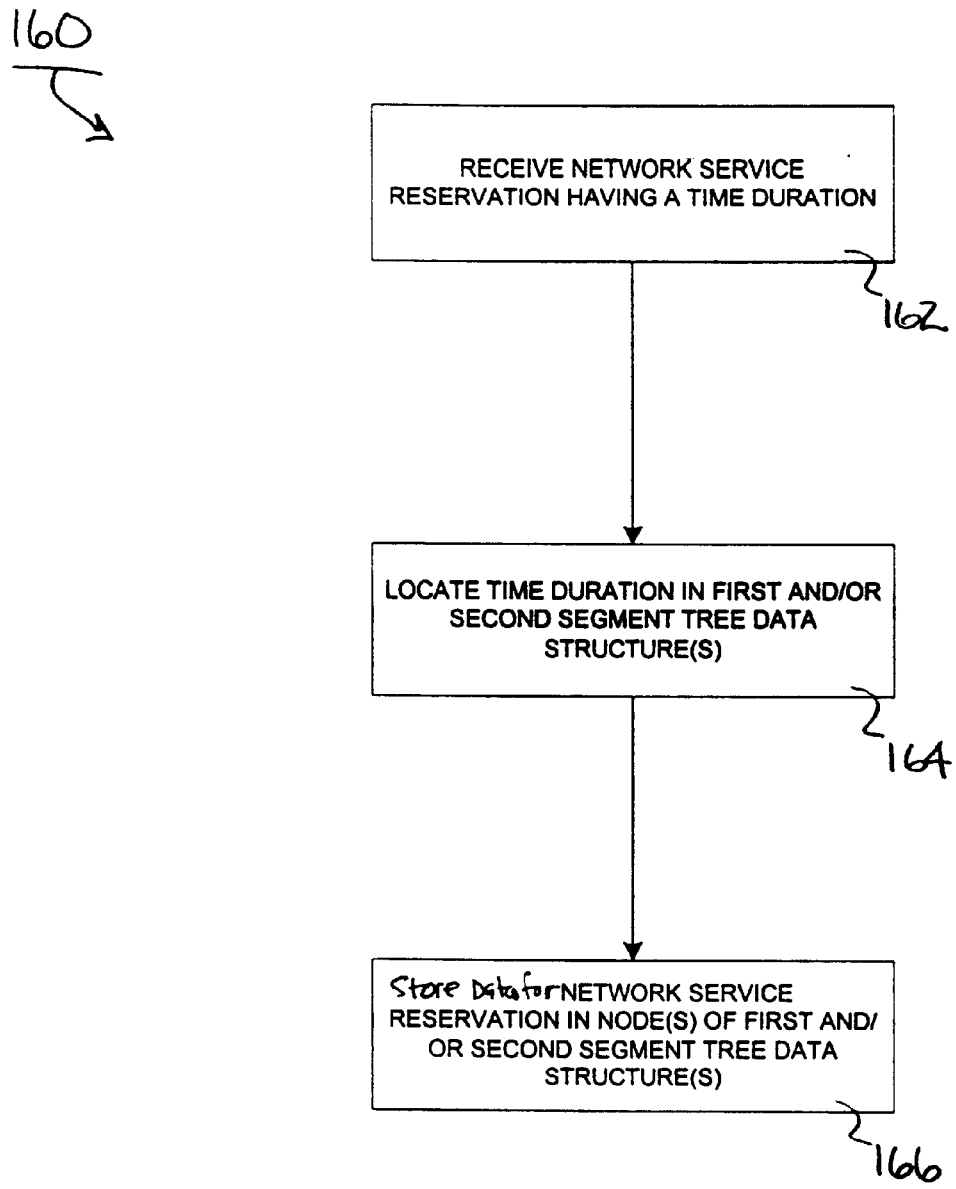
FIG. 18 is a flowchart showing a process for storing data from a service reservation in a segment tree data structure.

Referring to FIG. 18, a process 160 is shown for storing time duration data for network service reservations in segment tree data structures 146 and 150. Process 160 receives (162) a network service reservation from, e.g., engine 26. Process 160 examines the network service reservation to determine its time duration data and locates (164) a corresponding time duration in segment tree data structure 146 and/or 150. Process 160 stores (166) the time duration data in either, or both, segment tree data structures, depending on the duration.

Figure 17B:
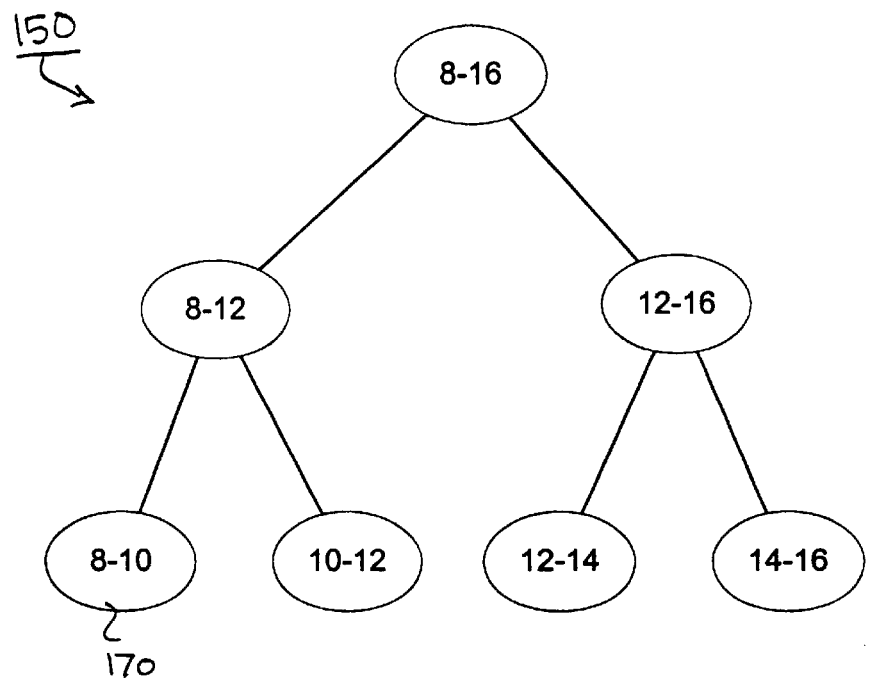
Figure 17C:
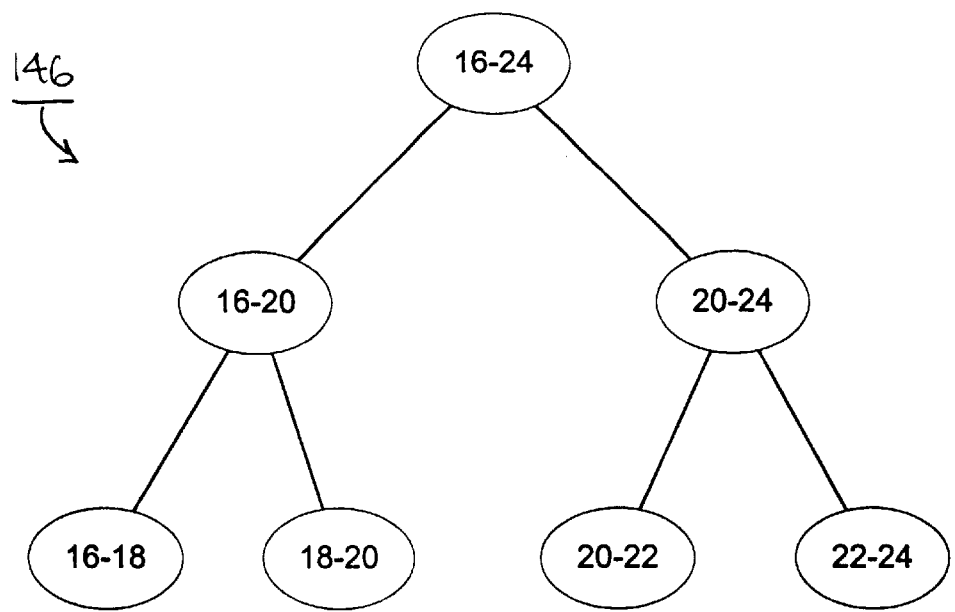
Figure 17D:
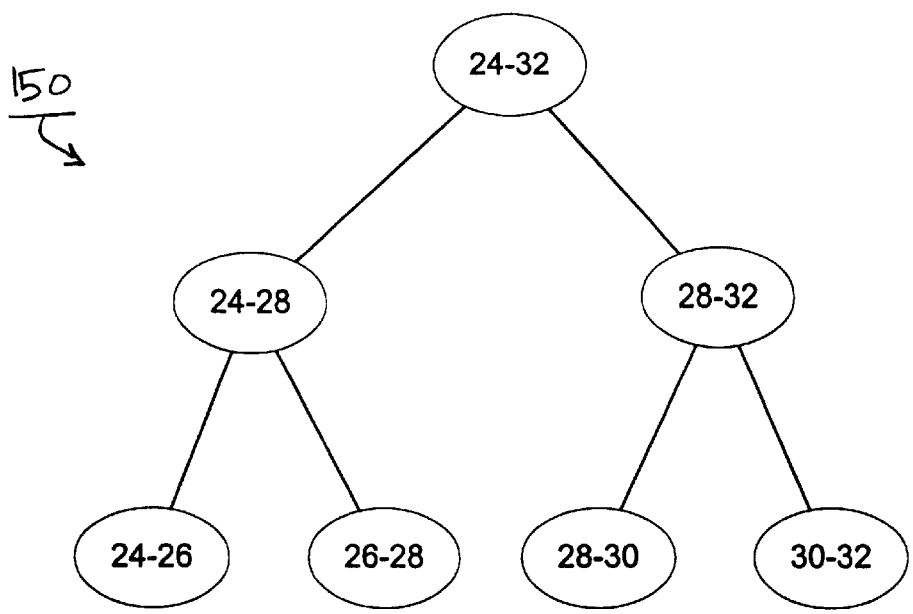

By way of example, referring to FIGS. 17A and 17B, if the network service reservation covers time duration "6–10," node 168 from segment tree data structure 146 is used to store the "6–8" portion of the reservation and node 170 from segment tree data structure 150 is used to store the "8–10" portion of the reservation. The data structures are then reset upon expiration in accordance with process 142.

C. Generating Parent Nodes

Figure 19:
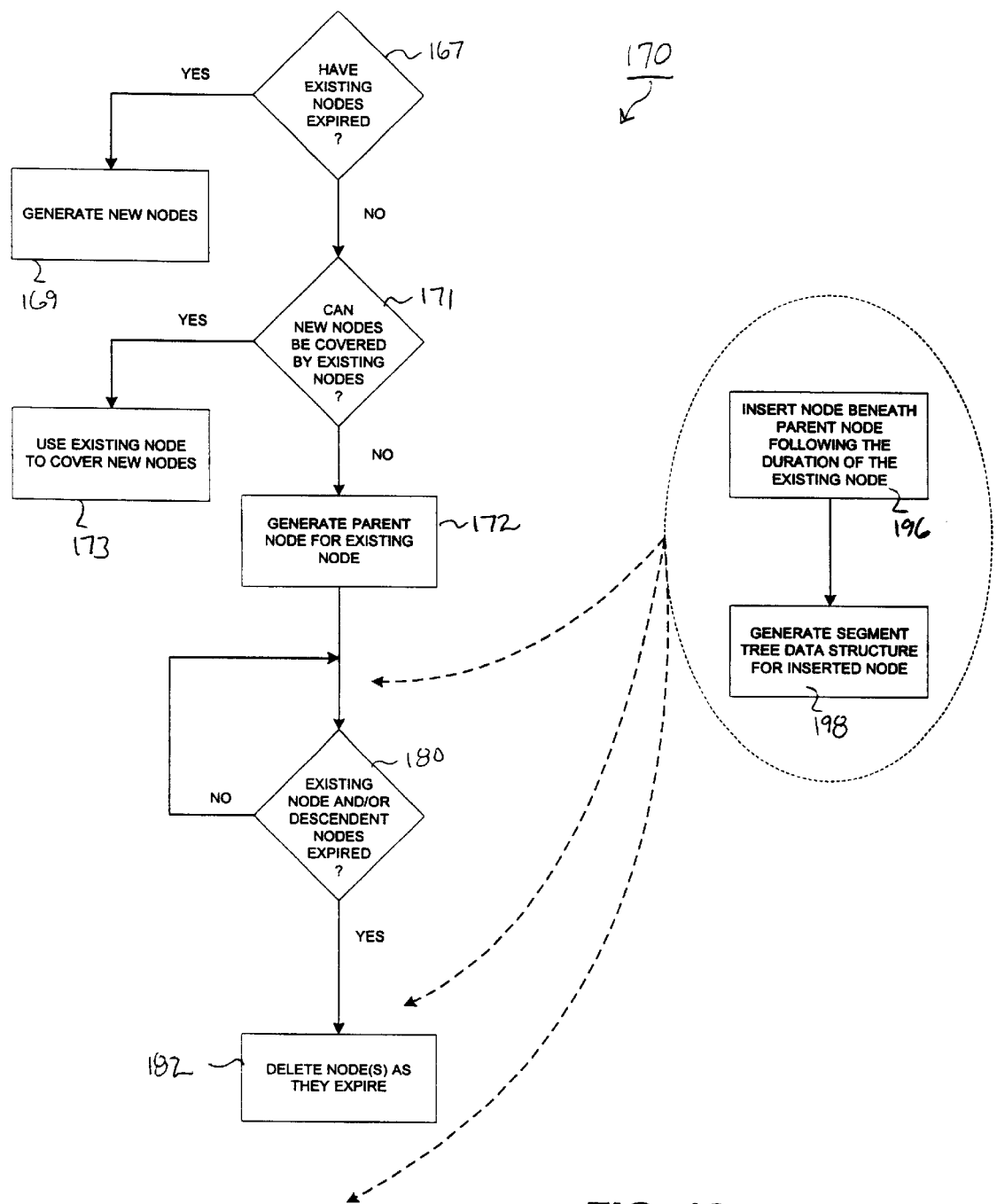
FIG. 19 is a flowchart showing a process for generating parent nodes and deleting expired nodes in a segment tree data structure.

Referring to FIG. 19, another process 170 is shown for generating a segment tree data structure that can be used to store time duration data for network service reservations. Process 170 is performed by scheduler 20 and stores the resulting segment tree data structure in resource manager repository 25. Process 170 determines (167) if nodes in an existing segment tree data structure have expired. If such nodes have expired, process 170 deletes the expired nodes and generates (169) a new segment tree data structure, e.g., in accordance with the processes described in sections (A) and (B) above. If it is determined that the root parent node is no longer being used, it too is deleted and the only remaining child node becomes the new parent. This allows the segment tree to expand and contract as needed.

Figure 20A:
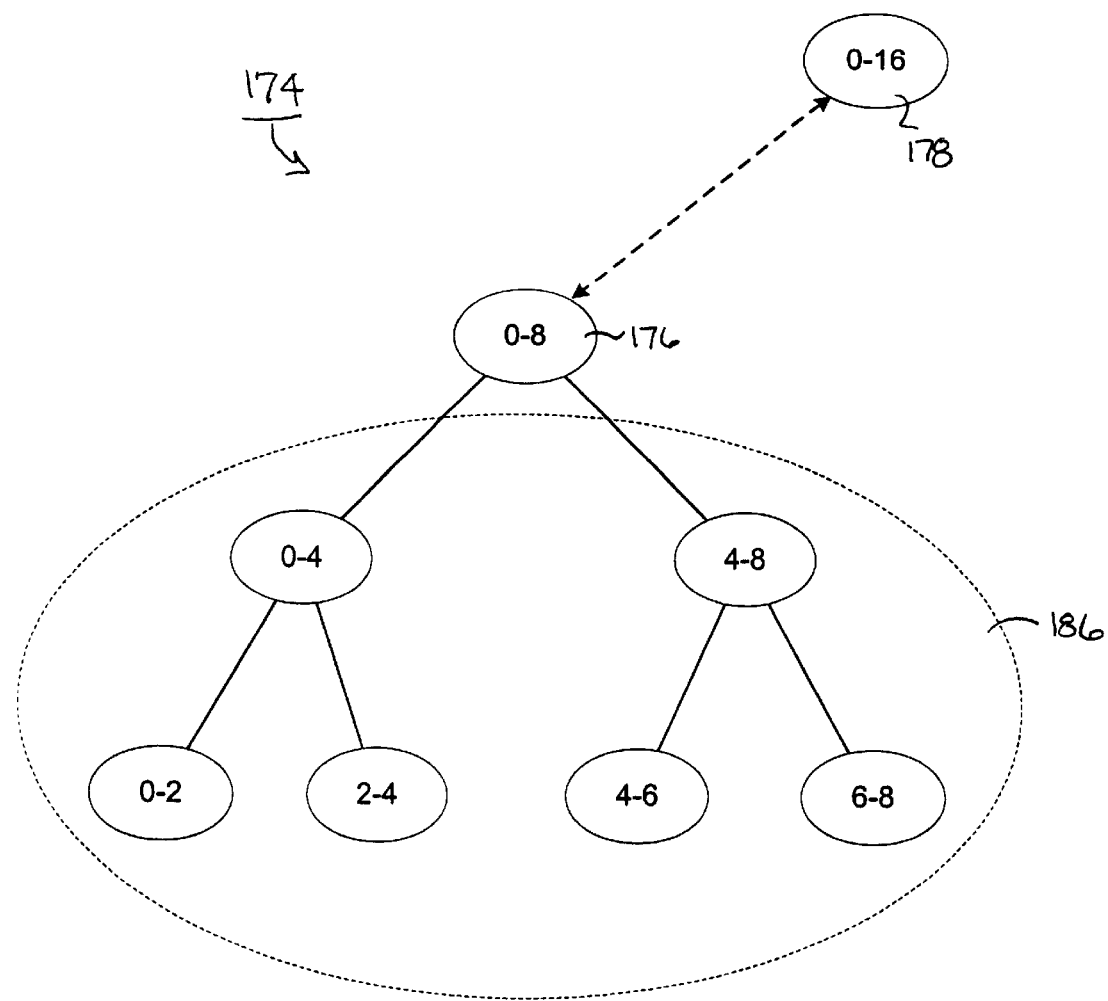
FIG. 20A shows an existing segment tree data structure and a parent node therefor.

When a new service reservation arrives, process 170 determines (171) if the existing nodes can cover the duration of the network service reservation. If those existing nodes can cover the duration of the network service reservation, process 170 stores (173) the time duration data at appropriate nodes of the existing segment tree data structure. If the existing segment tree data structure cannot cover the duration of the network service reservation, process 170 generates (172) one or more parent nodes for an existing parent node of an existing segment tree data structure. The generated parent node has a duration that encompasses the duration of the existing parent node. For example, FIG. 20A shows an existing data structure 174 having an existing parent node 176 covering time duration "0–8." Process 170 generates a parent node 178, covering time duration "0–16," which encompasses time duration "0–8." It is noted that the generated parent node need not start at time "0", particularly if all descendent nodes containing time "0" have expired. The generated parent node may start and end at any time. More than one parent node may be generated in accordance with process 170. For example, if there is an initial time duration of 0–8 and a reservation is required for time 0–32, three additional parent nodes (assuming each node has two equal half child nodes) are created. The three parent nodes cover 0–16, 16–32 and 0–32, with the 0–16 and 16–32 nodes being child nodes of 0–32 node.

Figure 20B:
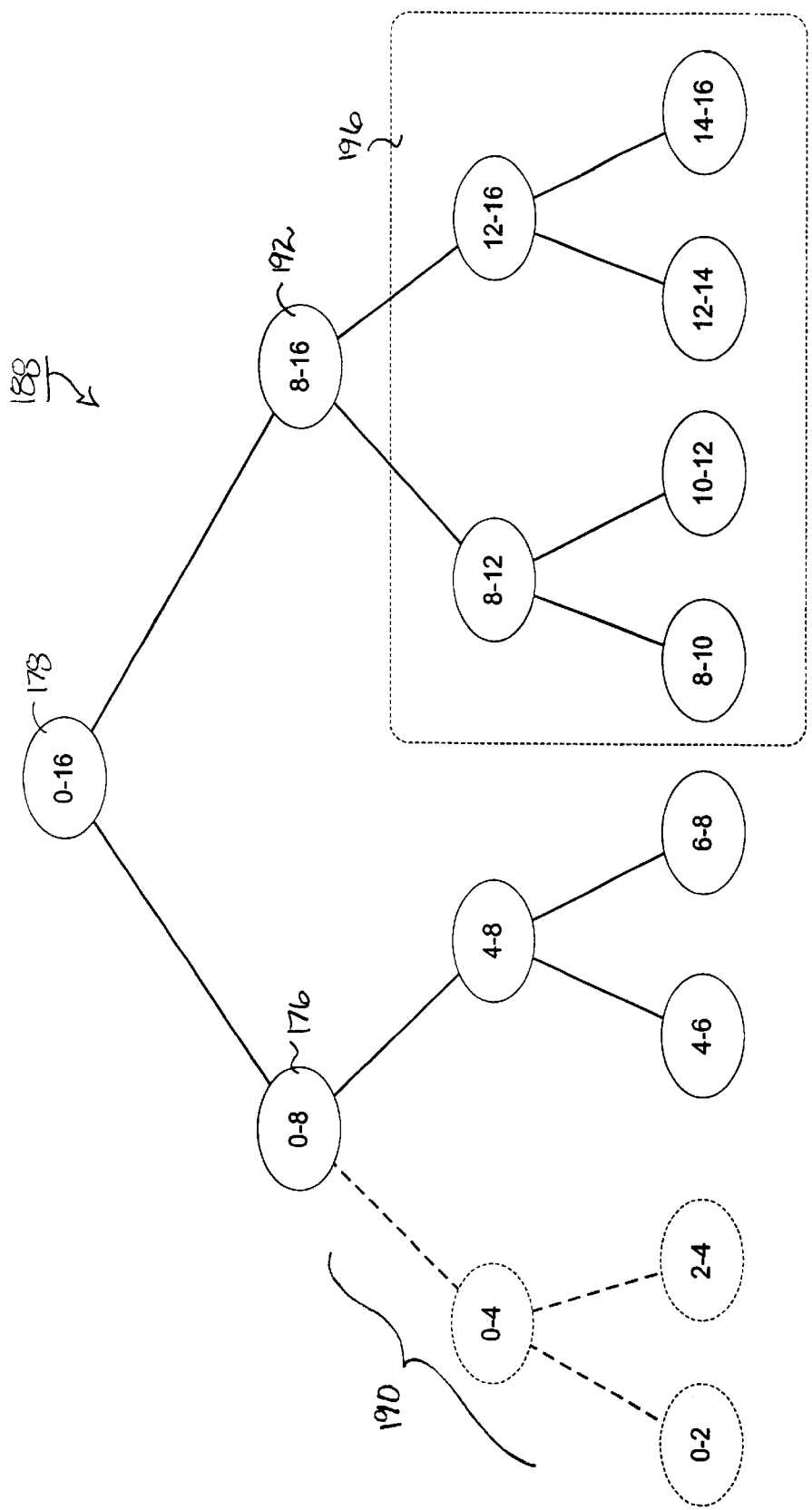
FIG. 20B shows an additional segment tree data structure inserted below the parent node.

As existing nodes of segment tree data structure 174 expire (180), process 170 deletes (182) these nodes from memory. Any nodes may be deleted as they expire, including parent node 176 and/or descendent nodes 186. For example, in segment tree data structure 188 (described below), nodes 190 (shown as dotted lines) have expired and, therefore, have been deleted. At a point in process 170, a node 192 (FIG. 20B) is inserted (196) beneath the generated parent node 178 to cover a time duration following the duration of existing parent node 176. In the example shown in FIG. 20b, a node 192, covering time duration "8–16" is inserted beneath generated parent node 178. As shown, node 192 branches off to a corresponding segment tree data structure 196. This corresponding segment tree data structure may be generated (198) beforehand or in real time according to process 100, or it may be a fully-subdivided segment tree data structure, as shown, e.g., in FIG. 12.

By adding parent nodes to an existing segment tree data structure, it is possible to extend the duration of the existing segment tree data structure. By deleting nodes as they expire, process 170 reduces the amount of memory needed to store the segment tree data structure even though the data structure has been extended.

Process 170 may be repeated as node 192 and its descendent nodes expire. For example, a new parent node covering "0–32" may be generated and node 178 covering "0–16" may be inserted beneath the "0–32" node. This process may be repeated as necessary to continually extend the time duration of the segment tree data structure.

III. Architecture

The processes described herein are not limited to use with the particular hardware/software configuration of FIGS. 1 and 2; they may find applicability in any computing or processing environment. The processes may be controlled by, and implemented in, computer programs executing on programmable computers that each includes a processor, a storage medium readable by the processor (including volatile and non-volatile memory and/or storage elements), at least one input device, and one or more output devices. Program code may be applied to data entered using an input device to perform the processes.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform the processes described above. The invention may also be implemented as a computer-readable storage medium, configured with a computer program, where, upon execution, instructions in the computer program cause the computer to operate to control the above processes. Also, an ASIC or programmable logic, such as an FPGA, may be used to implement processes 100, 142, 160 and 170.

Processes 100, 142, 160 and 170 are not limited to storing data from network service reservations; nor are they limited to use with resource manager 11 or in a networking context. Rather, processes 100, 142, 160 and 170 may be used in any context to generate a data structure for storing any type of data that defines a range of values. Any and/or all features of processes 100, 142, 160 and 170 may be combined to implement a new process, not explicitly described herein, for generating a segment tree data structure.

It is to be understood that while the invention has been described in conjunction with the detailed description thereof, the foregoing description is intended to illustrate and not to limit the scope of the invention. Other aspects, advantages, and modifications are within the scope of the following claims.

What is claimed is:

1. A method of storing data over a range of values using a segment tree data structure, comprising:
   generating one or more nodes to cover the range of values based on a parent node in the segment tree data structure, the one or more nodes being generated by subdividing nodes of the segment tree data structure only along paths from the parent node to the one or more nodes; and
   storing the data in the one or more nodes.

2. The method of claim 1, wherein the data comprises data from a network service reservation and the range of values comprise a duration of the network service reservation.

3. The method of claim 2, wherein the one or more nodes each has a granularity that makes it possible to cover, without exceeding, the duration of the network service reservation.

4. The method of claim 1, wherein subdividing comprises generating child nodes for each subdivided node, each of the child nodes covering a portion of a duration of the subdivided node.

5. The method of claim 4, wherein subdividing generates two nodes for each subdivided node, each of the two nodes covering half of the duration of the subdivided node.

6. The method of claim 1, wherein the range of values defines a time duration and the one or more nodes correspond to the time duration.

7. The method of claim 6, wherein, if more than one node is generated, resulting nodes when combined have a duration that corresponds to the time duration.

8. The method of claim 1, wherein subdividing is not performed along potential branches of the segment tree data structure that are not on paths from the parent node to the one or more nodes.

9. A method of populating nodes in segment tree data structures, comprising:
   generating a first segment tree data structure that includes nodes covering a first time duration;
   generating a second segment tree data structure that includes nodes covering a second time duration; and
   resetting nodes in the first segment tree data structure to cover a third time duration following expiration of the first time duration.

10. The method of claim 9, further comprising:
    resetting nodes in the second segment tree data structure to cover a fourth time duration following expiration of the second time duration.

11. The method of claim 9, further comprising:
    receiving a network service reservation, the network service having a predetermined time duration;
    determining which of the first and second segment tree data structure(s) has one or more nodes that cover the predetermined time duration; and
    storing data from the network service reservation using the segment tree data structures(s) determined to have one or more nodes that cover the predetermined time duration.

12. A method of generating a segment tree data structure, comprising:
    generating a parent node for an existing node of a segment tree data structure, the parent node having a duration that encompasses a duration of the existing node; and
    deleting the existing node following a duration of the existing node.

13. The method of claim 12, further comprising:
    deleting a descendent node of the existing node when a duration of the descendent node expires.

14. The method of claim 12, further comprising:
    inserting a node beneath the parent node that covers a duration following the duration of the existing node.

15. The method of claim 14, wherein the node inserted beneath the parent node branches off to a corresponding segment tree data structure.

16. The method of claim 12, further comprising:
    receiving a network service reservation, the network service reservation having a predetermined time duration;
    generating one or more nodes to cover the network service reservation based on the parent node, the one or more nodes being generated by subdividing nodes of the segment tree data structure along paths from the parent node to the one or more nodes; and
    storing data from the network service reservation in the one or more nodes.

17. A computer-readable medium storing a data structure, the data structure comprising:
    a plurality of nodes arranged in a tree structure, the plurality of nodes comprising:
    a parent node relating to a range of values; and
    one or more final nodes, each of the one or more final nodes relating to a subset of the range of values;
    wherein the data structure stores a predetermined range of values in the one or more final nodes; and
    wherein the one or more final nodes are generated by subdividing nodes in the tree structure, starting with the parent node, along paths from the parent node to one or more nodes that correspond to the predetermined range of values.

18. The computer-readable medium of claim 17, wherein the predetermined range of values comprises data from a network service reservation.

19. The computer-readable medium of claim 17, wherein the one or more final nodes are generated by subdividing nodes in the tree structure, starting with the parent node, only along paths from the parent node to one or more nodes that correspond to the predetermined range of values.

20. A computer program stored on a computer-readable medium for storing data over a range of values using a segment tree data structure, the computer program comprising instructions that cause a computer to:
    generate one or more nodes to cover the range of values based on a parent node in the segment tree data structure, the one or more nodes being generated by subdividing nodes of the segment tree data structure only along paths from the parent node to the one or more nodes; and
    store the data in the one or more nodes.

21. The computer program of claim 20, wherein the data comprises data from a network service reservation and the range of values comprises a duration of the network service reservation.

22. The computer program of claim 21, wherein the one or more nodes each has a granularity that makes it possible to cover, without exceeding, the duration of the network service reservation.

23. The computer program of claim 20, wherein subdividing comprises generating child nodes for each subdivided node, each of the child nodes covering a portion of a duration of the subdivided node.

24. The computer program of claim 23, wherein subdividing generates two nodes for each subdivided node, each of the two nodes covering half of the duration of the subdivided node.

25. The computer program of claim 20, wherein the range of values defines a time duration and the one or more nodes correspond to the time duration.

26. The computer program of claim 25, wherein, if more than one node is generated, resulting nodes when combined have a duration that corresponds to the time duration.

27. The computer program of claim 20, wherein subdividing is not performed along potential branches of the segment tree data structure that are not on paths from the parent node to the one or more nodes.

28. A computer program stored on a computer-readable medium for populating nodes in segment tree data structures, the computer program comprising instructions that cause a computer to:
generate a first segment tree data structure that includes nodes covering a first time duration;
generate a second segment tree data structure that includes nodes covering a second time duration; and
reset nodes in the first segment tree data structure:to cover a third time duration following expiration of the first time duration.

29. The computer program of claim 28, further comprising instructions that cause the computer to:
reset nodes in the second segment tree data structure to cover a fourth time duration following expiration of the second time duration.

30. The computer program of claim 28, further comprising instructions that cause the computer to:
receive a network service reservation, the network service reservation having a predetermined time duration;
determine which of the first and second segment tree data structure(s) has one or more nodes that cover the predetermined time duration; and
store data from the network service reservation using the segment tree data structure(s) determined to have one or more nodes that cover the predetermined time duration.

31. A computer program stored on a computer-readable medium for generating a segment tree data structure, the computer program comprising instructions that cause a computer to:
generate a parent node for an existing node of a segment tree data structure, the parent node having a duration that encompasses a duration of the existing node; and
delete the existing node following a duration of the existing node.

32. The computer program of claim 31, further comprising instructions that cause the computer to:
delete a descendent node of the existing node when a duration of the descendent node expires.

33. The computer program of claim 31, further comprising instructions that cause the computer to:
insert a node beneath the parent node that covers a duration following the duration of the existing node.

34. The computer program of claim 33, wherein the node inserted beneath the parent node branches off to a corresponding segment tree data structure.

35. The computer program of claim 31, further comprising instructions that cause the computer to:
receive a network service reservation, the network service reservation having a predetermined time duration;
generate one or more nodes to cover the network service reservation based on the parent node, the one or more nodes being generated by subdividing nodes of the segment tree data structure along paths from the parent node to the one or more nodes; and
store data from the network service reservation in the one or more nodes.

36. An apparatus for storing data over a range of values using a segment tree data structure, the apparatus comprising circuitry which:
generates one or more nodes to cover the range of values based on a parent node in the segment tree data structure, the one or more nodes being generated by subdividing nodes of the segment tree data structure only along paths from the parent node to the one or more nodes; and
stores the data in the one or more nodes.

37. The apparatus of claim 36, wherein the data comprises data from a network service reservation and the range of values comprises a duration of the network service reservation.

38. The apparatus of claim 37, wherein the one or more nodes each has a granularity that makes it possible to cover, without exceeding, the duration of the network service reservation.

39. The apparatus of claim 36, wherein subdividing comprises generating child nodes for each subdivided node, each of the child nodes covering a portion of a duration of the subdivided node.

40. The apparatus of claim 39, wherein subdividing generates two nodes for each subdivided node, each of the two nodes covering half of the duration of the subdivided node.

41. The apparatus of claim 36, wherein the range of values defines a time duration and the one or more nodes correspond to the time duration.

42. The apparatus of claim 41, wherein, if more than one node is generated, resulting nodes when combined have a duration that corresponds to the time duration.

43. The apparatus of claim 35, wherein subdividing is not performed along potential branches of the segment tree data structure that are not on paths from the parent node to the one or more nodes.

44. The apparatus of claim 36, wherein the circuitry comprises a processor and a memory.

45. The apparatus of claim 36 wherein the circuitry comprises hardware elements and/or programmable logic.

46. An apparatus for populating nodes in segment tree data structures, the apparatus comprising circuitry which:
generates a first segment tree data structure that includes nodes covering a first time duration;
generates a second segment tree data structure that includes nodes covering a second time duration; and
resets nodes in the first segment tree data structure to cover a third time duration following expiration of the first time duration.

47. The apparatus of claim 46, wherein the circuitry resets nodes in the second segment tree data structure to cover a fourth time duration following expiration of the second time duration.

48. The apparatus of claim 46, wherein the circuitry:
receives a network service reservation, the network service having a predetermined time duration;

determines which of the first and second segment tree data structure(s) has one or more nodes that cover the predetermined time duration; and stores data from the network service reservation using the segment tree data structure(s) determined to have one or more nodes that cover the predetermined time duration.

49. The apparatus of claim 46, wherein the circuitry comprises a processor and a memory.

50. The apparatus of claim 46 wherein the circuitry comprises hardware elements and/or programmable logic.

51. An apparatus for generating a segment tree data structure, the apparatus comprising circuitry which:

generates a parent node for an existing node of a segment tree data structure, the parent node having a duration that encompasses a duration of the existing node; and deletes the existing node following a duration of the existing node.

52. The apparatus of claim 51, wherein the circuitry deletes a descendent node of the existing node when a duration of the descendent node expires.

53. The apparatus of claim 51, wherein the circuitry inserts a node beneath the parent node that covers a duration following the duration of the existing node.

54. The apparatus of claim 53, wherein the node inserted beneath the parent node branches off to a corresponding segment tree data structure.

55. The apparatus of claim 51, wherein the circuitry:

receives a network service reservation, the network service reservation having a predetermined time duration;

generates one or more nodes to cover the network service reservation based on the parent node, the one or more nodes being generated by subdividing nodes of the segment tree data structure along paths from the parent node to the one or more nodes; and stores data from the network service reservation in the one or more nodes.

56. The apparatus of claim 51, wherein the circuitry comprises a processor and a memory.

57. The apparatus of claim 51 wherein the circuitry comprises hardware elements and/or programmable logic.

* * * * *